US012669153B2

(12) United States Patent
Battlogg

(10) Patent No.: US 12,669,153 B2
(45) Date of Patent: Jun. 30, 2026

(54) STEERING DEVICE WITH A MAGNETORHEOLOGICAL BRAKING DEVICE AND METHOD FOR OPERATING A STEERING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 624 days.

(21) Appl. No.: 18/248,941

(22) PCT Filed: Oct. 12, 2021

(86) PCT No.: PCT/EP2021/078180
§ 371 (c)(1),
(2) Date: Apr. 13, 2023

(87) PCT Pub. No.: WO2022/079030
PCT Pub. Date: Apr. 21, 2022

(65) Prior Publication Data
US 2023/0406401 A1 Dec. 21, 2023

(30) Foreign Application Priority Data

Oct. 13, 2020 (DE) ..................... 10 2020 126 916.1
Dec. 12, 2020 (DE) ..................... 10 2020 133 246.7

(51) Int. Cl.
*F16D 57/00* (2006.01)
*B60K 35/10* (2024.01)
(Continued)

(52) U.S. Cl.
CPC ........... *F16D 57/002* (2013.01); *B60K 35/10* (2024.01); *B62D 5/006* (2013.01); *G05G 1/08* (2013.01);
(Continued)

(58) Field of Classification Search
None
See application file for complete search history.

(56) References Cited

U.S. PATENT DOCUMENTS 3,305,055 A * 2/1967 Slaughter ................ F16D 37/02
192/58.1
10,976,827 B2 4/2021 Battlogg
(Continued)

FOREIGN PATENT DOCUMENTS

CN 110869885 A 3/2020
DE 10029191 A1 12/2001
(Continued)

OTHER PUBLICATIONS

WO-2019068286-A1: English Machine Translation (Year: 2019).*

*Primary Examiner* — Melanie Torres Williams
(74) *Attorney, Agent, or Firm* — Laurence A. Greenberg; Werner H. Stemer; Ralph E. Locher

(57) ABSTRACT

A vehicle Steering device with a movable steering unit that is braked by a braking device. The braking device has a stationary holder and two brake components. One brake component is rotated by the steering unit. One brake component is rotatably fixed to the holder. The brake component are continuously rotatable relative to one another about a rotational axis. A first brake component extends along the rotational axis and has a magnetically conductive core. The second brake component has a hollow casing part extending around the first brake component. A peripheral gap, filled with a magnetorheological medium, is arranged between the two brake components. The gap has two different braking gap portions. In a first braking gap portion, a disk contour is formed between the casing part and the core. In a second braking gap portion, a plurality of roller bodies are arranged around the circumference of the core.

41 Claims, 5 Drawing Sheets

(51) Int. Cl.

| | |
|---|---|
| B62D 5/00 | (2006.01) |
| G05G 1/08 | (2006.01) |
| G05G 5/03 | (2008.04) |

(52) U.S. Cl.

CPC .......... G05G 5/03 (2013.01); B60K 2360/126 (2024.01)

(56) References Cited

U.S. PATENT DOCUMENTS

| | | | |
|---|---|---|---|
| 11,231,780 | B2 | 1/2022 | Battlogg |
| 11,295,632 | B2 | 4/2022 | Greiner |
| 2002/0057152 | A1 | 5/2002 | Elferich et al. |
| 2006/0197741 | A1 | 9/2006 | Biggadike |
| 2006/0280575 | A1 | 12/2006 | Ruettiger |
| 2020/0174512 | A1 | 6/2020 | Battlogg |
| 2020/0257369 | A1 | 8/2020 | Battlogg |
| 2020/0355229 | A1 | 11/2020 | Battlogg |

FOREIGN PATENT DOCUMENTS

| | | | | |
|---|---|---|---|---|
| DE | 10221241 | A1 | 11/2003 | |
| DE | 102004041690 | A1 | 3/2005 | |
| DE | 102004009906 | B3 | 7/2005 | |
| DE | 102010055831 | A1 | 6/2012 | |
| DE | 102017111031 | A1 | 11/2018 | |
| DE | 102018100390 | A1 | 7/2019 | |
| DE | 102018222844 | B3 | 4/2020 | |
| EP | 2603774 | B1 | 3/2015 | |
| EP | 3118075 | A1 | 1/2017 | |
| EP | 3299658 | B1 | 8/2019 | |
| EP | 3317750 | B1 | 10/2019 | |
| WO | 2012034697 | A1 | 3/2012 | |
| WO | 2018215350 | A1 | 11/2018 | |
| WO | WO-2019068286 | A1 * | 4/2019 | ............ F16D 37/02 |

* cited by examiner

70

3,13   77   72   71

78   76   75   2

68

69

29
29a   32

3
21
5
13

2

29b

22

3
21
5
13

22   29b

2

261   262

264
263

STEERING DEVICE WITH A MAGNETORHEOLOGICAL BRAKING DEVICE AND METHOD FOR OPERATING A STEERING DEVICE

FIELD AND BACKGROUND OF THE INVENTION

The invention relates to a steering device for controlling a vehicle by means of a movable steering unit and a method for operating a steering device. The steering device comprises a magnetorheological braking device with a stationary holder and with at least two braking components which can be rotated continuously relative to one another about an axis of rotation.

High demands are placed on such steering devices. For example, precise steering feedback and backlash-free or jerk-free steering behavior, especially around the center position, and overall very smooth, harmonious steering behavior are required. In addition, the braking device must be able to provide high braking torques, for example for hard end stops when the steering wheel is turning quickly (i.e., high kinetic energy if the steering wheel is turned quickly when maneuvering, for example at 1000°/s). Due to the sharp increase in the number of controls in the steering wheel, the steering wheels are becoming heavier, which increases kinetic energy. High braking torques are also required when the driver (or user) holds or supports himself/ herself on the steering wheel when getting out or in (aid for getting in and out). Such braking torques can be, for example, 25 newton meters, 35 newton meters or more.

At the same time, the braking device must also be able to provide very low braking torques (less than 1 newton meter, preferably less than 0.5 newton meters), for example if only very slight steering movements are made to keep in lane when driving straight ahead. Likewise, low braking torques are required for steering movements around the central position or when changing direction (e.g., 1 to 3 newton meters) so that the vehicle can be guided softly and a winding stretch of road can be driven through quickly and harmoniously at the same time. Overall, sensitive and precise steering is only possible with very smooth steering. For example, braking torques of less than one newton meter are desired.

Furthermore, it should be possible to adjust different braking torques without any noticeable transitions or step-lessly and with high control quality. In addition, the braking torques should be adjustable with the shortest possible response times, for example in less than 100 ms. The installation space for the steering device is generally very limited, for example in a dashboard in modern vehicles with a head-up display.

The aforementioned requirements are technologically very difficult to achieve. One problem is that high braking torques usually require corresponding friction diameters and sizes, which in turn disadvantageously increases the basic torque (also referred to as idling torque). However, a high basic torque is contrary to the requirement for easy steering.

For example, friction clutches are known which offer a high maximum braking torque. However, when there is no current, the friction surfaces required to achieve the braking torque cause unfavorably high basic friction, for example one newton meter of basic friction at a maximum braking torque of 20 newton meters.

Furthermore, steering systems with an electric motor have become known, which is coupled to the steering wheel either directly or via a reduction gear or (toothed) belt. Such directly attached electric motors generate, for example, active braking torques (nominal torques) of up to eight newton meters and briefly passive braking torques of up to 25 newton meters. Because of the correspondingly high braking torque, however, such electric motors are large and heavy as well as sluggish (mass moment of inertia) and often expensive. Due to the large working range, the controllability at low braking torques is in need of improvement.

For example, electric motors translated via belt drives and attached parallel to the steering train (indirect arrangement) should be designed more advantageously, the additional belt drive, belt wheels, brackets require space and cause flexibility, play and additional costs.

Because electric motors in the steering system have to generate the high braking torque primarily at low speeds, the electricity requirement or power requirement is also disadvantageously high. At the same time, electric motors have a very unfavorable level of efficiency at low speeds or when stationary (e.g., to provide an end stop) and therefore often heat up very quickly. This in turn degrades the efficiency as the coil resistance increases. As a result, it heats up even faster, everything shakes up, the power requirement increases quickly and very sharply.

A steer-by-wire steering system for a motor vehicle with an electric motor and a magnetorheological brake is known from DE 10 221 241 A1.

Magnetorheological brakes with magnetorheological fluids are known from the prior art, e.g., the MRF brake from Lord Corporation in various sizes (5 Nm, 12 Nm, 20 Nm): https://www.lord.com/products-and-solutions/steer-by-wire-tactile-feedback-device. These are also used as "steer-by-wire tactile feedback", among other things. These brakes work on their own. A disadvantage of these MRF brakes, however, is their relatively high basic friction (basic torque) in relation to the maximum torque (working range). The working range of the 5 Nm brake According to Lord's website/specification, it is 0.5 to 5 Nm (factor 10), with the 12 Nm brake the working range is between 1 Nm and 12 Nm (factor 12) and with the 20 Nm brake the working range is between 1 Nm and 20 Nm (factor 20) This relatively small working range is for many Applications are not sufficient, which is why these series products are primarily used for coarse motor applications (among other things, operation mostly with gloves, as in industry, on agricultural machines, on forklifts . . . ).

For (predominantly) fine-motor applications such as steering a passenger car, a significantly lower basic torque with a simultaneously higher maximum torque is advantageous, i.e., a significantly larger working range. The high basic torque, in particular, quickly leads to fatigue when steering, for example, or does not feel comfortable. However, the well-known MRF brakes do not allow a large working range because the friction surfaces are too large.

Although smaller friction surfaces would reduce the basic torque, this would also reduce the maximum torque, which would be unfavorable for steering systems in particular.

SUMMARY OF THE INVENTION

In contrast, it is the object of the present invention to provide an improved steering device.

In particular, the steering device should meet the requirements discussed above as far as possible and preferably at the same time offer a reliable and safe function and be economical to produce.

This object is achieved by a steering device having the features of the claims. The method according to the invention is the subject of the further claims. Preferred developments of the invention are the subject of the dependent claims. Further advantages and features of the present invention result from the general description and from the description of the exemplary embodiments.

The steering device according to the invention serves to control (steer) a vehicle by means of a (at least partially manually) movable steering unit. A movement of the steering unit can be braked (in particular damped) by means of at least one magnetorheological braking device. The braking device includes a stationary holder and at least two braking components. At least one of the at least two brake components is rotatable by the steering unit. In particular, the braking component is rotatably coupled to the steering unit. At least one other of the at least two brake components is rotationally connected to the bracket. The two brake components are continuously rotatable relative to each other about an axis of rotation. A first braking component extends along the axis of rotation. This means that the first braking component extends at least in sections along the axis of rotation. Or that at least a portion of the first braking component, or preferably a substantial part of the first braking component, extends along the axis of rotation. The first braking component includes a core made of a magnetically conductive material. The second brake component comprises a shell part which extends around the first brake component (in particular in the radial and/or axial direction) and is of hollow design. At least one circumferential gap that is at least partially filled with a magnetorheological medium is formed between the first and the second brake component. In this case, the gap comprises at least two different braking gap sections. The brake gap sections are in particular formed radially. Additionally or alternatively, the brake gap sections can also be formed axially. In this case, a disk contour is formed between the casing part and the core in or on a first braking gap section. A plurality of rolling bodies is arranged on the circumference of the core at or in a second braking gap section.

The steering device according to the invention offers many advantages. The combination of the two different braking gap sections offers a considerable advantage. In this way, the brake gap section with the disk contour can be used to generate low and at the same time particularly precisely controllable braking torques. With the braking gap section with the rolling elements, particularly high braking torques can be generated, for example for end stops or to help people get in and out. A particular advantage is that both braking sections have a particularly low basic torque. A further advantage is that such a braking device requires little installation space overall and can be implemented in a structurally uncomplicated manner and can be manufactured economically. In addition, the steering device according to the invention is particularly reliable since the braking gap sections enable redundancy.

The steering device can be used in motor vehicles (e.g., passenger cars; ON-Highway vehicles), aircraft, airplanes, ships, boats, in agricultural engineering, for example in tractors or combine harvesters, harvesters and other field machines for agriculture (OFF-Highway Vehicles). It can also be used in construction machinery and, for example, forklifts or similar machines or in simulators for simulating vehicle control (gaming; sim race; computer peripherals . . . ). The steering device can also be used in particular for vehicles that are at least partially autonomous.

The steering unit can be designed, for example, as a steering wheel, a handlebar or handlebar, joystick, control yoke, control pedal, control lever or as a joystick or as a control wheel. Other designs of movable steering units for steering vehicles are also possible. The movement of the steering unit is in particular a rotary movement. In particular, the steering unit can be moved in at least two directions of rotation. The movement of the steering unit can also be another type of movement. The steering device can comprise at least one transmission device which is suitable and designed to convert the movement of the steering unit into a rotational movement of one of the components of the braking device.

In all configurations it is preferred that the braking torque can be adjusted in real time.

In particular, the steering device comprises at least one actuator device for converting a steering movement carried out with the steering unit into a vehicle movement. In particular, the steering unit and the actuator device are functionally connected only electrically and/or only electromagnetically. In particular, the steering unit and the actuator device (in normal operation) are not mechanically coupled. A mechanical coupling can be provided in emergency operation. In particular, the steering device is a steer-by-wire steering system. This also includes steer-by-wire steering systems, which engage the steering train in special situations, such as an emergency or a fail-safe situation, i.e., there is in particular a mechanical coupling between the steering unit or driver and wheel. In such an embodiment, the invention offers a particularly large number of advantages.

However, it is also possible for the steering device to be designed as a mechanical steering system and preferably as a power steering system. The two different brake gap sections can also be advantageously used with such a steering system.

In the case of an active influencing of the magnetorheological medium, the braking device has in particular a braking torque. In the case of an inactive influencing of the magnetorheological medium, the braking device has in particular a basic torque. The basic torque is at least a factor of 50 and preferably at least a factor of 90 and particularly preferably at least a factor of 100 less than a maximum braking torque that can be made available with the braking device. This offers a particularly large working area. This offers a particularly advantageous steering behavior and can be implemented particularly well with the braking device presented here. For the movement resistance of the steering unit, there is in particular a torque which is made up of at least the braking torque and the basic torque.

It is possible and advantageous for the braking device to have a basic torque of at most 0.5 newton meters and preferably at most 0.25 newton meters and particularly preferably at most 0.1 Newton meters when influencing the magnetorheological medium in an inactive manner.

In particular, a maximum braking torque of at least 25 Newton meters and preferably at least 45 Newton meters and particularly preferably at least 50 newton meters can be generated with the braking device by actively influencing the magnetorheological medium.

In all of the configurations, it is preferred and advantageous that a braking torque that is at least twice as high as with the first brake gap section can be generated with the second brake gap section. In particular, a braking torque that is at least three times and preferably at least five times and particularly preferably at least ten times as high as with the first brake gap section can be generated with the second brake gap section.

In particular, only part and preferably less than half of the maximum braking torque can be generated with the first braking gap section. In particular, less than a quarter and preferably less than an eighth of the maximum braking torque can be generated with the first brake gap section. In particular, a braking torque can be generated with the first brake gap section, which is between zero newton meters and ten newton meters and preferably between zero newton meters and eight newton meters and particularly preferably between zero newton meters and five newton meters. Such braking torques can be adjusted with the first braking gap section with a particularly high control quality.

In particular, a major part and preferably at least two thirds of the maximum braking torque can be generated with the second brake gap section. In particular, at least three quarters or even at least 90% of the maximum braking torque can be generated. It is possible that the maximum braking torque can be generated solely with the second brake gap section. It is possible that at the same time as the second braking gap section, the first braking gap section is also activated for support. With such braking torques, the second brake gap section can be used particularly advantageously, since its properties in terms of controllability do not pose a disadvantage.

It is preferred and advantageous that a braking torque can be adjusted with the first brake gap section with a higher resolution than with the second brake gap section.

The first braking gap section preferably has a resolution that is at least ten times higher than that of the second braking gap section.

In particular, a braking torque with a resolution of at least 0.5 newton meters and preferably at least 0.25 newton meters and particularly preferably at least 0.15 newton meters can be generated with the first brake gap section.

In all of the configurations, it is preferred and advantageous for a first electrical coil to be assigned to the first brake gap section and a second electrical coil to be assigned to the second brake gap section. In particular, the coils can be controlled separately. In particular, the coils serve to generate a (magnetic) field for influencing the magnetorheological medium. In particular, the coils can be controlled (in particular intelligently) by the steering control unit (described below). Such a refinement enables particularly sensitive steering behavior and also offers reliable redundancy.

It is also possible for the at least two braking gap sections to be supplied by a common coil. Then, for example, at least one electrical coil wound around the axis of rotation and surrounding the core is provided between the casing part and the core. In special/borderline cases or emergencies, the electric motor can be switched on to increase the maximum braking torque.

In particular, the steering device comprises at least one steering control unit for controlling the braking device. In particular, the braking torques of the at least two brake gap sections can be adjusted independently of one another with the steering control unit. In particular, the steering control unit serves to control the braking device depending on a position of the steering unit and/or depending on a movement parameter of the steering unit and/or depending on an operating state of the vehicle and/or depending on "data".

"Data" can be, for example: vehicle data such as speed, lateral acceleration, spatial position, braking values, GPS position, environment recognition, data/position of other vehicles (located in the vicinity of the vehicle), trailer yes/no, loading, passenger data (height, weight, clothing, seating position, analysis data based on the evaluation of this data with e.g. artificial intelligence and suggestions; noises, gestures), external data (e.g. the driver's home sends data to the car; parking garage data in a parking garage . . . ).

A person's steering behavior in winter with a thick coat is different than in summer with thin clothing. The thick coat restricts the freedom of movement and therefore leads to a different steering behavior. If the control electronics recognize this based on "data," the behavior can be adjusted, such as: A quick tug on the steering to avoid evasion is more difficult with a thick and tight-fitting coat (physically stiff) and in reality slower. Here can be intelligent in this respect be counteracted by increasing the ratio of the steering angle on the steering wheel to the steering angle on the wheel or wheels, so that the evasive maneuver is still quick. be reduced because the heavy jacket acts as a damper.

If, based on the "data" and/or the near-field detection, it is recognized, for example, that the driver is tired and steering carelessly, this can be intelligently compensated. The driver can be warned (ripples or vibrations) or the steering unit implements the driver's command (turning the steering wheel) differently with the help of e.g., artificial intelligence, i.e. the movement of the steering wheel is not included 1:1 in the wheel adjustment. On a straight road (highway), this can prevent the vehicle from "snaking" and rocking.

On the other hand, such intelligent electronics can recognize fatigue based on data analysis (steering movements, face recognition, strange movement patterns of the driver, temperature, breath sounds . . . ) and intervene (warning; reduction of speed to a standstill; autonomous parking . . . ). This is particularly useful in the event of e.g., a dizzy spell, heart attack or similar.

The vehicle can also be prevented from being steered or moved if the data analysis recognizes that a child is behind the wheel (force, changing grip, near-field detection). If in doubt, the steering torque can be briefly increased in order to see whether the driver has enough strength when starting the vehicle, which is not the case with children.

The vehicle (machine learning/artificial intelligence/GPS data . . . ) knows, for example, that a pothole or a deep rut is about to occur, where the driver feels the vehicle restless or incorrectly due to this (body movement, pulling on the steering wheel . . . ). steers (track groove pulls too much to the edge . . . ). Here, the intelligent braking unit counteracts this and "calms down" this unnecessary or dynamically poor steering movement so that the destination is reached safely, comfortably and comfortably.

Similarly with snow, slippery surfaces, stones, etc. The steering adjusts itself in particular and the active and passive moment is adjusted accordingly. In winter, if a vehicle slips when cornering (e.g., understeer) because of a slippery surface (snow, ice . . . ), the driver usually oversteers out of panic. As soon as the vehicle has grip again, it turns too much because of the steering, which leads to accidents. Here the steering torque should be increased or the driver should be given (haptic feedback, e.g., in the form of a ripple) that he oversteers.

The opposite is true when you drift (e.g., again in winter with snow and ice). Here the inexperienced driver usually steers too little and "loses" the vehicle, it skids. Here the steering can be made very easy, which promotes oversteering.

Some people like to keep the wheel all the way up (between 10 and 2 o'clock). This leads to more steering angle changes in the event of vibrations or the steering wheel is more difficult to keep still in this posture or it can also swing up (also referred to as motion sickness). If the interior monitor sees this steering wheel position, the torque can be increased a little in particular, which leads to smoother driving.

Small people also have a completely different steering wheel position than tall people and also different leverage distances due to the different lengths of their limbs. Shorter arms require more frequent gripping with larger steering wheel movements, which leads to unsteady steering maneuvers. If the grasping around or disadvantageous kinematic arm positions are detected ("data", near field detection; analysis of the angle of rotation . . . ), the control unit or the artificial intelligence can "calm down" this process in particular, i.e., make it more harmonious.

This can also be an advantage if the driver has been on the road for a long time.

A haptic feedback when changing lanes can be performed. If two lanes are changed, there is a different feedback. Everything in combination with the "data" (e.g., navigation system, environment recognition . . . ). In particular, the steering provides appropriate feedback.

The invention is also advantageous in the following situations: parking spaces or parking areas in cities or multi-story car parks are expensive and should be used as best as possible. The parking spaces could be of different sizes and ideally assigned to the vehicle via a data package (radio, WLAN, 5G . . . ) when driving into the parking garage. When parking, "the intelligent multi-story car park" should support the parking process, i.e., specify the ideal parking position and transmit it to the parked vehicle. The intelligent steering then carries out this or makes suggestions, which the driver then accepts and carries out or not (if e.g., there is an object in the parking space that was not recognized by the multi-story car park). The "intelligent multi-story car park" also knows and communicates whether the neighboring vehicle had a passenger or not, i.e., your own vehicle can be parked closer to the passenger door. The user of the neighboring vehicle could also deposit and inform the "parking garage" that he is coming back with a passenger. If a vehicle is parked for a long time and this is communicated to the intelligent parking garage or parking space and the one parked next door is parked for a shorter time, it could even be parked close to the vehicle door, which in turn would save a lot of parking space. When buying tickets online, e.g., in airport car parks, you already know exactly how long you will be parked.

The parking process by means of the steering device and thus the distance to the next vehicle could also be adapted to the necessary door opening angle in advantageous configurations, so that the driver or the passengers can get in and out without problems. Based on the "data", the vehicle knows the opening angle or the body dimensions of the passengers. The intelligent parking garage can also record/recognize these necessary distances and distribute (use) them intelligently. If, based on the "data", the intelligent steering system notices that areas are being driven on that should not be driven on (e.g. pedestrian zones, cycle paths, blocking smiles, towards a building . . . ), haptic feedback can be output, up to and including intervention (counter steering; standstill of the vehicle) However, a warning feedback is preferably always output first and the driver can also override this (it is therefore not patronized but usually only warned).

In particular, the position of the steering unit can be described (relatively or absolutely) by a rotation angle. In particular, the movement parameter includes at least one parameter from a group of parameters comprising: speed, angular velocity, torque, acceleration (negative and positive), duration. For example, targeted braking can take place if the steering movement is too rapid.

In particular, at least one sensor device for detecting these parameters is provided for controlling the braking device as a function of the aforementioned parameters. In particular, the steering control unit is operatively connected to at least one such sensor device. The position and/or the movement parameter can be detected by sensors on the steering unit and/or on the braking device. For example, the braking device includes at least one sensor device for detecting a position of the first component relative to the second component.

The operating state is defined in particular by at least one parameter from a group of parameters, including: vehicle speed, vehicle acceleration (negative and positive), wheel position, rudder position, steering angle, load status, user profile, temperature outside, temperature inside, weather conditions, time of year, traffic situation, Road condition or terrain condition, control variables of safety systems or assistance systems. The steering control device is preferably suitable and designed to select at least one brake gap section of the at least two brake gap sections depending on the level of a braking torque to be set and at least to brake the movement of the steering unit. In particular, the steering control unit takes into account the maximum braking torque that can be generated with the respective brake gap section. In particular, at least one value range of the adjustable braking torque is assigned to the at least two brake gap sections. Depending on the value range in which the braking torque to be set lies, the appropriate brake gap section can be selected.

The steering control unit is preferably suitable and designed to generate a braking torque for braking the movement of the steering unit at least predominantly and preferably only with the first brake gap section when the vehicle speed is above a limit value (and the vehicle is operating normally). Such a limit value is, for example, 15 km/h or 25 km/h. At such or higher speeds, the braking torques must be set with a particularly high resolution in order not to negatively influence the steering behavior.

The steering control device is particularly suitable and designed to block mobility of the steering unit and to generate the necessary braking torque predominantly and preferably only with the second brake gap section. In particular, the mobility of the steering unit can be blocked by means of the braking device. In particular, a steering wheel lock can be provided as a result. In particular, this can provide a support option on the steering unit. For example, the blocked steering unit can be used to hold on when getting out and/or getting in.

In particular, the steering control device is suitable and designed to generate an end stop for the mobility of the steering unit at least predominantly and preferably only with the second brake gap section. Such an end stop is generated, for example, when the wheels or a rudder have reached the end of their intended path of movement.

For example, the steering means may comprise a steering wheel. Vehicles usually have various functions built into the steering wheel, e.g., buttons, knobs and wheels for operating on-board computers, etc., but also displays, steering wheel heating, etc., all of which require electricity and must receive and send signals. The electrical connection can be made, for example, via friction contacts, inductively, wirelessly or a coil spring.

It is advantageous and preferred that the steering control device is suitable and designed to brake or even block mobility of the steering unit depending on a driver assistance system. This can prevent critical steering movements. In particular, the steering control device selects at least one brake gap section of the at least two brake gap sections and controls it. For example, the first brake gap section is selected for sensitive braking and the second brake gap section is selected for blocking.

A lane keeping system, for example, can be provided as a driving assistance system. Braking the steering unit can prevent you from leaving a lane or warn the driver (e.g., ripples). In addition, if the driver assistance system detects a critical driving situation and, for example, the vehicle swerving, a hectic steering movement and/or oversteering can be prevented by braking the steering unit in a targeted manner.

The driver assistance system can also include a parking aid. Then, by braking or blocking the steering unit, contact of the wheels with an obstacle (curb) can be prevented, for example. In particular, the steering control unit and/or the driver assistance system include at least one sensor device for detecting such situations (surround view; image recognition; radar, lidar . . . ). Such a sensor device can, for example, include an environment sensor and/or a GPS system.

It is possible for the steering control device to be suitable and designed to take into account a user property for setting the braking torque. For example, the user characteristic can include a seating position, user height, user weight, user clothing and/or the user's ability to drive. The user property can be stored in a user profile and/or can be detected by sensors. For example, near-field detection and/or an internal camera (e.g., with image/face recognition) are provided for this purpose.

The steering control unit is particularly suitable and designed to set the braking torque as a function of the position at which the steering unit is held. In this way, unfavorable holding of the steering unit can be compensated for by a higher braking torque, so that no unwanted steering movements occur, for example when there are potholes.

In all of the configurations, it is preferred and advantageous that the steering control device is suitable and designed to generate feedback that is haptically perceptible on the steering unit. The feedback includes in particular a defined sequence of braking torques. For example, such feedback can be perceived as a vibration on the steering unit. Rattling and/or jerking (ripples) can also be perceived. It is possible that the braking torques can be generated with an adjustable frequency. In particular, such feedback can be generated as a function of the position and/or the movement parameter of the steering unit and/or an operating state of the vehicle and/or the user property. For example, the feedback can be used to warn you about dangerous maneuvers or to wake you up when you are tired. The feedback can also be used as a signal for a lane change.

In all of the configurations, it is preferred that the steering control device is suitable and designed to determine user behavior using at least one machine learning algorithm (also referred to as artificial intelligence) and to take it into account when setting the braking torque. In particular, data is continuously recorded and evaluated for this purpose. For example, the movement of the steering unit can be damped depending on existing muscle strength or tiredness or driving behavior. Image recognition can support this. If this recognizes a distorted face (certain gesture) when parking, for example, the support power can be increased. It is also possible that age-related changes in the steering device or other parts of the vehicle are taken into account.

The magnetorheological medium preferably comprises at least one metallic powder. In particular, the metallic powder has a volume fraction of at least 50% and preferably at least 60% or at least 70%. A particularly low basic torque can be achieved by using such a medium. At the same time, due to the high volume fraction, a particularly high maximum braking torque can be achieved. In addition, such a medium can be used with the same properties at the temperatures to be expected for the steering device. The powder is in particular taken up in a gaseous carrier medium and, for example, air.

The metallic powder is preferably in the form of carbonyl iron powder (pure iron) or at least includes such a powder. Other magnetorheologically addressable powders are also possible.

The metallic powder is particularly preferably provided with a coating.

The steering device can comprise at least one remanence device and/or at least one permanent magnet unit, which is suitable and designed to maintain a braking torque with at least one of the at least two brake gap sections even without the supply of electrical current. The remanence device is in particular operatively connected to the steering control unit. In particular, the remanence device is provided by at least one of the coils.

The steering device can include at least one safety device. The safety device is particularly suitable and designed to at least partially remove the magnetorheological medium from the gap. In particular, the safety device can remove the medium at least far enough for the steering unit to be essentially freely movable. In particular, the safety device can eliminate the braking torque and/or the basic torque. For example, the magnetorheological medium is removed from the gap by means of overpressure and/or underpressure. The safety device can include at least one pressure vessel and/or a detonator cap or the like. Such a safety device serves as an emergency system (so-called fail-safe mechanism) in the event of a fault in the braking device.

In all configurations it is particularly preferred that the braking device, in particular the first and/or second component and/or the gap, has a maximum diameter of less than 100 mm (in particular with a maximum braking torque of at least 25 Nm). As a result, the braking device can be accommodated in a particularly space-saving manner (e.g., in the dashboard). The braking device presented here is particularly suitable for such a maximum diameter.

In all configurations it is preferred that the steering device comprises at least one drive device for generating a drive torque for the active movement of the steering unit. The drive device is used in particular to generate a drive torque against which the steering unit must be moved manually. The drive device can also provision of the steering unit are used in a basic position. In particular, the drive device comprises at least one electric drive and, for example, an electric motor. The electric motor can also be a fly wheel motor, traveling wave motor or axial flux motor. In addition or as an alternative, the drive device can also include at least one force accumulator and, for example, a spring or the like.

In particular, the maximum braking torque of the second brake gap section is at least twice the maximum drive torque of the drive device. In particular, a maximum drive torque of less than or equal to twelve newton meters and preferably less than or equal to eight newton meters can be generated with the drive device.

If the drive device fails, the braking device can preferably provide a braking torque which is at least as high as its drive torque. Such a steering device is particularly safe and reliable, since the two braking gap sections, together with the possibility of compensating for the drive device, offer triple redundancy.

The braking device presented here offers the particular advantage in combination with the drive device that the drive device and e.g., an electric motor can be dimensioned significantly smaller. In addition, all moments that are to be applied passively can be taken over by the braking device. As a result, electrical energy can be saved, which is of great advantage, especially in electric vehicles.

The much smaller (weaker) electric motor can no longer snatch the steering wheel out of the driver's hand so easily in the event of a malfunction (e.g., incorrect sensor signal). In addition, the magnetorheological braking unit can counteract and over-brake the electric motor if implausible states are detected (the electric motor wants to hit hard even though the vehicle is driving at high speed on a highway).

It is preferred and advantageous that the steering control device is suitable and designed to at least approximately compensate for (regulate) fluctuations in the drive torque of the drive device by adjusting the braking torque (in particular with the first brake gap section). In particular, the fluctuations can be compensated to such an extent that they can no longer be felt haptically on the steering unit. Such fluctuations relate in particular to changes in the drive torque over the angle of rotation. In particular, the steering control unit is suitable and designed to control the drive torque essentially constantly over the angle of rotation.

The disk contour can include at least one star contour. In particular, in the area of the star contour, there is a variable gap height over the circumference of the braking gap section. In particular, magnetic field concentrators are arranged on the star contour. In particular, the magnetic field concentrators project radially into the braking gap section. Such a star contour reduces the friction surface between the parts rotating in relation to one another, which means that the basic torque is particularly low. At the same time, the star contour results in a so-called heap formation for the magnetorheological medium, which enables particularly high braking torques.

In a particularly preferred and advantageous embodiment, at least three braking gap sections are provided. In particular, at least one third brake gap section is arranged axially between a first brake gap section and a second brake gap section. In particular, at least one first electrical coil is assigned to the first brake gap section and at least one separately controllable second electrical coil is assigned to the second brake gap section. In particular, the third braking gap section is both the first and associated with the second electric coil.

At least two differently designed brake gap sections are particularly preferably included. In particular, the first and the second brake gap sections are designed differently from one another. The first and the second brake gap sections are preferably designed differently in the radial (and/or axial) direction and/or are designed differently in terms of function.

The redundancy provided by such a system with two electrical coils is also advantageous. If one coil should fail, the second coil can still generate a magnetic field and thus a controllable torque across the braking gap, although not with the same quality. This is very beneficial for applications that require a high level of reliability.

In particular, the first brake gap section and the second brake gap section are designed differently. Preferably, at least two (functionally) different (in particular radially and/or axially) configured brake gap sections are included. The braking gap sections are preferably formed separately from one another and, in advantageous configurations, are separated from one another in the axial direction.

Preferably, the first braking gap section and the second braking gap section have different widths (gap height) and/or have different cross-sectional profiles.

It is also particularly preferred that at least partially different materials are used on the first braking gap section and the second braking gap section. In particular, the materials used on the core and/or the casing part can differ at least in sections in the areas of the first braking gap section and the second braking gap section. It can be the same or different materials and designs for the electrical coils are used.

The two brake gap sections can have different running clearances and gap dimensions and/or gap contours and gap profiles (of the parts moving towards one another). A small gap height can result in higher moments, but is often more difficult to control in terms of control technology. A large gap height usually behaves in the opposite way (lower moment, but overall better controllable). Depending on the requirements, one (first) or the other (second) coil can be energized. For example, an end stop (stop, barrier) usually requires very high torques and little control technology, since the actuator is virtually stationary (standstill). Here a small gap (gap height) or possible rotating bodies/rollers in the braking gap section are efficient. Braking that is as constant as possible at higher speeds, on the other hand, regularly requires high control quality; a larger gap height and/or a disk/star contour on a braking gap section is advantageous here.

The first braking component defines an axial direction. In particular, an axis of symmetry of the first braking component is the axis of rotation. Preferably, the core of the first brake component extends in the axial direction, but may also have a slight angle to the axial direction.

The invention makes it possible to generate a high braking torque at different speeds in a small space. The magnetic field passes through the two different braking gap sections between the core and the casing part, each essentially radially or at least transversely to the axis of rotation.

The rolling bodies on or in the second brake gap section serve in particular as magnetic field concentrators. Due to the rolling elements (serving as magnetic field concentrators) there can be acute angles between the individual magnetic field lines and the radial alignment, but generally or in on average, the magnetic field runs essentially radially. The same also applies to the other brake gap section with the disk contour, in which a three-dimensional alignment of the magnetic field lines can also result at the radial end of the disk contour, but which are again essentially radially aligned on average or overall.

In preferred developments, the first electrical coil and the second electrical coil are designed differently. The first electrical coil and the second electrical coil preferably differ in at least one parameter from a group of parameters, which group includes the wire diameter and the wire cross-section, the number of windings, the winding window, the winding type, the coil width, the coil diameter and the material as parameters.

In particular, in an axial area (directly) adjacent to the first electrical coil, a disk contour or a disk body is formed between the casing part and the core, and in a (different) axial section (directly) adjacent to the second electrical coil, a plurality of rolling bodies (as magnetic field concentrators) arranged on the circumference of the core. In particular, the rolling elements are arranged in a common plane transversely or perpendicularly to the axis of rotation. Preferably, the rolling elements can move completely around the core. An outer surface of the core is preferably cylindrical in the second braking gap portion. The ring contour is preferably arranged (directly) between the first electrical coil and the second electrical coil.

A radius or (typical or maximum) diameter of the first brake gap section is preferably approximately and in particular exactly the same size as a radius or (typical or maximum) diameter of the second brake gap section and/or the third brake gap section. This means that large torques can also be generated at higher speeds and when starting from a standstill. The magnetorheological medium particularly wets the first and the second brake component at least in sections.

The first electrical coil and the second electrical coil are preferably wound around the axis of rotation and substantially generate a magnetic field in the axial direction within the core. The two electric coils are taken up radially between the core and the casing part. The electrical coils can be wound around the core or attached to the inside of the casing part.

The core consists of a magnetically (highly) conductive material. The first braking component comprises the core and in particular an axle or a shaft which in particular consists at least partially or completely of a magnetically non-conductive material. Preferably, the axle (the shaft) and the core are detachably connected to each other.

The disk contour consists at least partially or completely of a magnetically (well) conductive material.

In a preferred development, the disk contour is designed as a separate disk body. It is also possible that the disk contour is formed in one piece with the core and e.g., T-shaped, with the long leg of the "T" running along the axis of rotation. It is also possible that part of the disk contour is designed in one piece with the core and is supplemented by a separate disk body. In simple and particularly preferred ones configurations, the disk contour is formed by a separate disk body that is attached to or on the core.

The disk body is preferably applied to the core. For this purpose, the core has, in particular, an adapted receptacle. It is possible and preferred, for example, for the disk body to be connected or pressed onto the core. But it is also possible that the disk contour or the disk body is connected to the casing part and, for example, is pressed into it. It is also conceivable that two disk bodies adapted to one another are used, between which a radial brake gap section is formed. A first hollow-cylindrical disk contour can be applied to the core and a second hollow-cylindrical disk contour with a correspondingly large inner diameter can be introduced into the casing part, so that the two disk contours are aligned with one another in the axial direction, for example, and leave a small (radial) gap between them. Between the two disk contours then remains a braking gap section which is in particular essentially radial.

In particularly preferred configurations, the pane contour has at least one pane pack. The stack of panes is formed in particular by a plurality of preferably directly adjoining sheet metal panes. Such an embodiment enables, for example, the manufacture of the sheet metal disks as a stamped part. Punched parts can be produced particularly easily and inexpensively in large numbers. If they are stacked on top of each other and, for example, pressed together, a pack of disks or a disk body with a significantly greater thickness can be provided. As a result, sheet metal panes and also pane packs can be produced very cost-effectively.

It is preferred that at least some sheet metal disks or almost all sheet metal disks or all sheet metal disks are each round and have the same diameter or at least similar diameters. However, it is also possible to use a few or individual disk plates that are not round, on which, for example, a non-round outer contour or a toothed structure or star contour is formed radially on the outside. If circular and non-circular disk sheets are stacked to form a disk package, a complex outer contour can be created, which can locally lead to a greater magnetic field concentration. It is also possible for a disk pack to include a plurality of round (or non-round) disk sheets with different outside diameters. In this way, round sheet metal plates with a smaller and a larger diameter can be provided alternately.

Individual disks can also have different properties (e.g., due to different material). Individual disks can also be made of (sintered) magnetic material (e.g., neodymium).

In particularly preferred configurations, the disk contour has a cylindrical outer contour overall. It is also possible and preferred that the disk contour includes a star contour or is designed as such.

It is possible and preferred for the disk contour to have an (axially) outwardly protruding outer contour on at least one axial side. The disk contour can be conical, bulbous, rounded or stepped overall. In particular, the disk contour is rotationally symmetrical in the area of the outer contour. The outwardly projecting outer contour can, for example, be supported on a cover or the like or be guided there. The outwardly protruding outer contour thereby makes it possible to provide a reservoir of magnetorheological particles.

In all configurations using rolling elements, it is preferred that a radial free space for a rolling element between the shell part and the core in the second brake gap section is greater than a gap height in the first brake gap section (in the area of the disk contour). A radial free space results from the difference in the gap height in the second brake gap section minus the diameter of the rolling element. The radial free space is typically divided approximately equally radially outside of the rolling body and radially inside of the rolling body. In simple cases, the rolling element is arranged radially in the middle and the radial distance is the outer surface of the rolling element to the inner surface of the shell part and the radial distance from the outer peripheral surface of the core to the radially inner outer surface of the rolling element are approximately the same.

The radial free space (total) for a rolling body in the second brake gap section is preferably more than twice and in particular at least three times as large as the gap height in the first brake gap section. This means that in the normal case, the rolling element has more play radially outwards and radially inwards than the gap height on the disk body in the first braking gap section. It is also possible and preferred that the radial free space for a rolling body in the second brake gap section is four times or even greater than the gap height in the first brake gap section. A gap height at the braking gap section on the disk contour is preferably less than 0.15 mm and preferably less than 0.1 mm.

Preferably, the radial clearance in the second brake gap section and the gap height in the first brake gap section at the disk contour and the gap height in the third brake gap section are (considerably) smaller than a radial distance in other areas of the gap. The radial distance from the outer diameters of the electrical coils or from the outer diameter of a coating over the electrical coils or an extrusion coating of the electrical coils to the radial inner wall of the casing part is (axially) outside of the two brake gap sections preferably (considerably) larger than in the two brake gap sections. The difference in size can reach and far exceed a factor of 2 or 3.

In specific configurations, the radial clearance for a rolling element in the second brake gap section is approximately 0.2 mm, while the gap height in the first brake gap section is approximately 0.05 mm. Deviations of +/−50% are possible in each case. Overall, the radial play on a haptic control button in the area of the rolling elements is then twice the radial free space, since it is on opposite sides of the core each rolling elements are arranged, a total of 0.4 mm in this example. In the area of the first brake gap section with a gap height of 0.05 mm, there is a total radial play of 2*0.05 mm, i.e., 0.1 mm.

Because of this very small amount of play, in many cases a separate bearing can be dispensed with, at least at the end with the disk contour. The disk contour then, together with the shell part, takes over the guidance or bearing of the shell part relative to the core. This enables an even simpler and more cost-effective construction.

In all configurations, the inner contour and/or preferably the casing part can be non-circular (e.g., elliptical . . . ). The core can be mounted eccentrically to the shell part.

This results in a changing relative gap at certain points during the rotation (of the rotor to the stator).

In particularly preferred configurations, the electrical coils are arranged axially between the first and the second brake gap section. Particularly preferably, at least one braking gap section is axially directly or indirectly adjacent to one of the electrical coils.

In all configurations, it is particularly preferred that the magnetic field of the magnetic circuits passes at least partly axially through the core and the casing part and to a considerable extent radially and particularly preferably essentially radially through the third brake gap section. Furthermore, a significant part of the magnetic field of the first electrical coil passes radially and particularly preferably essentially radially through the first brake gap section and that of the second electrical coil through the second brake gap section. In simple configurations, the electrical coils are each wound around the core and generate a magnetic field in the axial direction of the axis of rotation within the core, which magnetic field is radially outward at the respective ends of the electrical coils and vice versa. Such a configuration allows a particularly simple, inexpensive and yet effective construction.

Preferably, the rolling bodies consist at least partially and in particular almost completely or completely of a magnetically conductive material.

Magnetic non-conductive bodies or rolling elements can also be present. Non-conductive bodies can serve as placeholders or guide elements and can have any shape. Thus, magnetically non-conductive bodies can be arranged between the (magnetically conductive) rolling bodies. Several non-conductive bodies (e.g., guide elements) can be connected to one another, e.g., in the form of a cage. This makes assembly easier.

The disk contour particularly preferably guides the casing part in a rotatable manner and serves as a bearing point.

A closed chamber is preferably formed between the brake components. In particular, the closed chamber is at least to a significant extent and in particular essentially filled with a magnetorheological medium such as a magnetorheological fluid and/or e.g., (dry or powdered) carbonyl iron powder filled. In particular, the second brake component is rotatably received on the first brake component.

The first braking component preferably includes an axle formed at least in part from a non-magnetically conductive material. The core made of a magnetically conductive material is attached to the axle or an inner part.

Preferably, the second braking component is axially displaceable taken on the first brake component. This can (also) serve, for example, to enable volume equalization in the event of temperature changes and/or in the event of a leak. It is preferred that a radial and/or axial position of the two brake components relative to one another is detected by sensors.

It is preferred and advantageous that the (in particular absolute) position of the steering device can be detected. In particular, the (in particular relative) position of the brake components can be detected. In particular, not only the relative position of the brake components should be detected, but also the absolute position of the steering device. Since the steering device can have electrical connections, such as a clock spring, and this must not be torn off. For this purpose, at least one absolute sensor is installed, which detects the end of the steering stop. The brake then produces in particular an end stop. The absolute sensor is also necessary in particular when the vehicle is parked and the steering angle is not in the neutral position. When the vehicle is put into operation again, the steering control unit can thus recognize the steering angle of the wheels.

A torque sensor can also be installed in the steering train or the steering shaft.

In all of the configurations, it is preferred that a click element is arranged at one and in particular at the distal end of the chamber. Such a click element allows in particular two states, after pressing the click element e.g., switches over a metal sheet in an audible and/or tactile manner and thereby performs a (small) axial displacement. Such e.g., designed as snap parts or snap disks click elements are known for example from keyboards or other devices and allow an inexpensive and effective tactile feedback when pressing a button or the like. The click element is preferably arranged at one end of the chamber. An elastic membrane particularly preferably separates the chamber from the click element. The click element can be designed as a snap part or snap disk. This can provide volume compensation to the chamber as the axle continues to enter or exit the chamber.

In particularly preferred developments, the snap-action disk is designed such that a change in the clamped volume of the snap-action disk between the two states of the snap-action disk is adapted to a cross-sectional area of the axis multiplied by an axial offset of the snap-action disk when actuated. In particular, the two volumes differ by less than 50% or 25% and preferably by less than 10% or less than 5%.

Such a configuration, in which the snap-action disk is adapted to the axis, ensures that only a small volume or possibly no volume at all has to be provided for volume compensation when the snap-action disk is actuated.

The use of a click element or snap part at the distal end of the chamber in connection with the formation of the first brake gap section with the disk contour also near the distal end of the chamber enables the casing part to be guided and supported in a particularly simple and effective manner, since there is only little radial play and the disk contour can therefore take over (in many cases) sufficient guidance in the radial direction of the shell part.

In preferred developments, a sensor device or at least one sensor device for detecting a relative angle of rotation between the core and the casing part is included.

A sensor device or at least one sensor device for detecting a relative axial position of the casing part in relation to the core is preferably included. Particularly preferably, the sensor device comprises or at least one sensor device at least one magnetic field sensor, which is designed to detect a rotation angle and an axial position. In particularly advantageous configurations, the sensor device comprises at least one Hall sensor.

In simple preferred configurations, the magnetic field sensor is accommodated on the stationary brake component and is exposed to a magnetic field acting in the radial direction. A rotation angle can also be determined via the orientation of the magnetic field sensor relative to the magnetic field. An axial displacement of the sensor device relative to the casing part can be derived from an intensity of the magnetic field strength.

At least one shielding device for at least partially shielding the sensor device from a magnetic field of the electrical coil is particularly preferably included. The shielding device preferably comprises at least one shielding body. The shielding body is designed in particular to shield a magnetic ring unit for applying a defined (eg radial) magnetic field to the magnetic field sensor from interfering magnetic influences of the electric coil. For this purpose, the shielding body preferably gives at least sections of the magnetic ring unit. The shielding device preferably surrounds the magnetic ring unit on three sides, namely on both axial sides and radially outwards. The shielding device preferably comprises at least one separating unit arranged between the shielding body and the magnetic ring unit. As a result, the magnetic field of the magnetic ring unit is decoupled from the shielding body. Furthermore, at least one magnetic decoupling device arranged between the shielding body and the casing part is preferably included. The separating unit and/or the decoupling device preferably have a magnetic conductivity that is many times lower than that of the shielding body. The shielding device and the magnetic ring unit are preferably arranged at a distance from one another.

A shielding device enables a significant improvement in the measurement quality. In particular, fine angular resolutions and small axial distances can be detected as a result.

The magnetic coil is preferably controlled mostly or predominantly during the operating time with a voltage of in particular 12V. In terms of haptics, it is (often) of considerable advantage if the braking torque of the magnetorheological braking device reaches the maximum or set value as quickly as possible. This is sometimes only possible with a greater voltage. A maximum braking torque is generally achieved by a maximum magnetic field in the braking gap. Since the magnetic field is generated by the current in the electrical coil (magnetic coil), the current must also be set to its maximum value as quickly as possible. In principle, you can always set the voltage to a high value, in this specific case instead of e.g., 12V to e.g., 24V. For this, however, all components (electrical coil or magnetic coil, the coil wire, etc.) would have to be designed differently (and e.g., a wire with a larger diameter would be used).

Therefore, in preferred refinements and developments, a higher voltage is set at least (in particular only) at the beginning of a haptic feedback (than would be necessary, for example, in continuous operation). In particular at the beginning or almost immediately after haptic feedback, a higher voltage is set (e.g., higher by a factor of 1.5 or 2 or 3 than would be necessary in continuous operation). In particular, the higher voltage is maintained until the current (or magnetic field) reaches the desired maximum value (close to, e.g., 90% or 95%) and/or the period of time that the higher voltage can act is reached or exceeded. Thereafter, the voltage to the lower voltage of e.g., regulated back 12 V. The system reacts faster and that desired braking torque is set more quickly.

In modern electric cars in particular, there are several voltages in the vehicle and high voltages/currents are possible, so that they do not have to be generated or transformed separately. Much higher voltages are also available in these electric vehicles (e.g., up to 800 volts) and such current strengths are possible that the properties described above can be used to advantage.

In particular, the magnetic field strength between individual magnetically polarizable particles of the magnetorheological medium is greater than 300 kA/m. In particular, the magnetic field strength that can be generated in the gap, preferably in at least one of the braking gap sections, is greater than 500 kA/m.

The method according to the invention is used to operate a steering device with a magnetorheological braking device with two braking components, with the two braking components being continuously rotatable relative to one another about an axis of rotation, with a first braking component extending along the axis of rotation and comprising a core made of a magnetically conductive material and with the second brake component comprises a hollow casing part extending around the first brake component, wherein at least three brake gap sections that are axially spaced apart from one another and run around the circumference and are at least partially filled with a magnetorheological medium are formed between the first and the second brake component. A first electrical coil generates a (first) controlled magnetic field in a first brake gap section. Irrespective of this, a second electrical coil generates a (second) controlled magnetic field in a second brake gap section in order to generate braking effects of different strengths, in particular depending on the speed. In this case, the magnetic fields of the first and second electrical coils are in particular both closed via the third braking gap will.

The method according to the invention also achieves the object set out above in a particularly advantageous manner. The method is in particular designed in such a way that the steering device according to the invention can then be operated. In particular, the steering device can be operated according to the method according to the invention.

In the context of the present invention, a blocking is understood in particular to mean that no movement of the steering unit (in at least one direction of rotation and/or in both (all) operational directions of rotation) can take place with manual force that is to be applied operationally. In particular, the mobility of the steering unit can also be released by means of the braking device. In the context of the present invention, a release is understood in particular to mean that there is only an operational basic torque (also referred to as no-load torque) of the braking device, without s an additional applied magnetorheological deceleration, for example by energizing the coil. If mobility is enabled, the magnetorheological braking device is in particular inactive, so that no field for actively influencing the magnetorheological medium is generated.

Further advantages and features of the present invention result from the exemplary embodiments, which are explained below with reference to the accompanying figures.

DETAILED DESCRIPTION OF THE INVENTION

Figure 1:
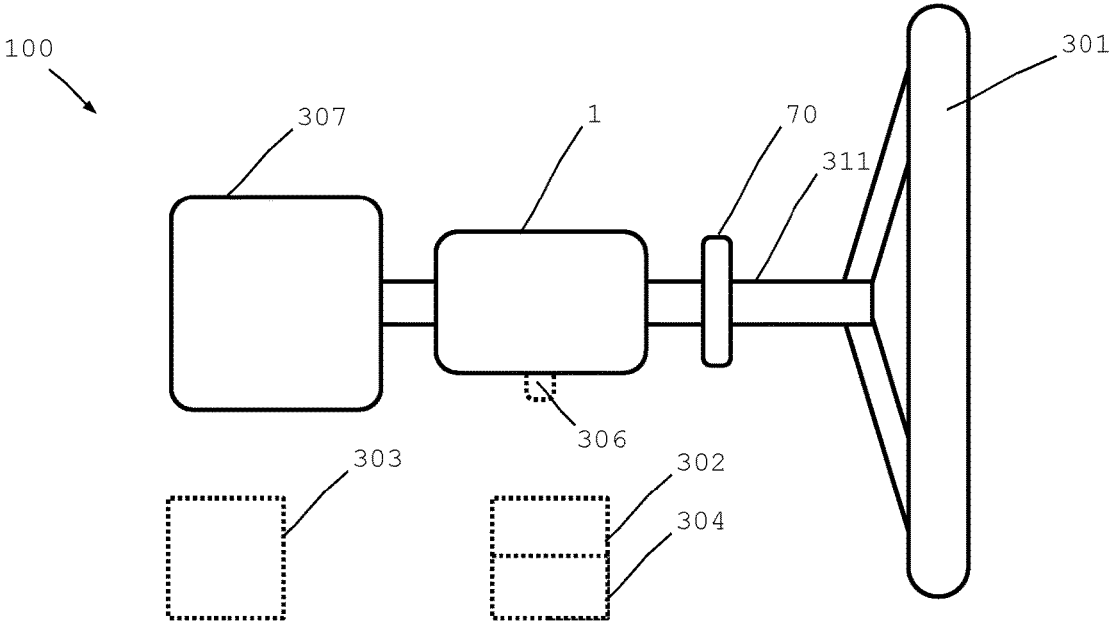
FIG. 1 is a purely schematic representation of a steering device according to the invention with a magnetorheological braking device.

FIG. 1 shows a steering device 100 according to the invention for steering a vehicle, not shown here, by means of a steering unit 301. The steering unit 101 is designed here as a rotatable steering wheel which is connected to a steering shaft in a torque-proof manner.

The steering device 100 is designed here as a steer-by-wire steering system. An actuator device 303 is used for this purpose to convert the steering movement carried out with the steering unit 301 into a vehicle movement. For example, the actuator device 303 steers the vehicle wheel or wheels. Actuator device 303 is only electrically connected to steering unit 101.

The rotational movement of the steering unit is detected by means of a sensor device 70 and, for example, a rotational angle sensor. Depending on the angle of rotation, the steers actuator device 303 then e.g., the vehicle wheel or wheels. It can thus e.g., the front and/or the rear wheels are steered or in a tricycle the tilt of the tricycle. It can also be used to steer the wheels of the front axle and rear axle or even all axles (so-called crab steering).

A drive device 307 designed as an electric motor is connected to the steering shaft 311 here. The steering unit 301 can be actively rotated by the drive device 307. As a result, the steering unit 301 is actively moved, for example when cornering, as would also be the case with a conventional mechanical steering system.

The movement of the steering unit 101 can be braked in a targeted manner by means of a magnetorheological braking device 1. To control the braking device 1 and also the drive device 307 depending on various parameters and e.g., the steering angle, a steering control unit 302 is provided here. For this purpose, the steering control unit 302 is operatively connected to the sensor device 70.

The steering control unit 302 also takes into account, for example, data from a driver assistance system 304. As a result, the movement of the steering unit 301 can be influenced in a targeted manner depending on the driving situation. The steering control unit 302 can also be operatively connected to other sensors, not shown in detail here, in order to be able to specifically influence the steering behavior as a function of other parameters.

The braking device 1 is equipped here with a safety device 306 which removes a magnetorheological medium 6 (not visible here) from a gap 5 (also not visible here). In the event of a fault, for example, the braking torque can be canceled very quickly and reliably. The gap 5 and the medium 6 are presented in more detail with reference to the following figures.

Figure 2:
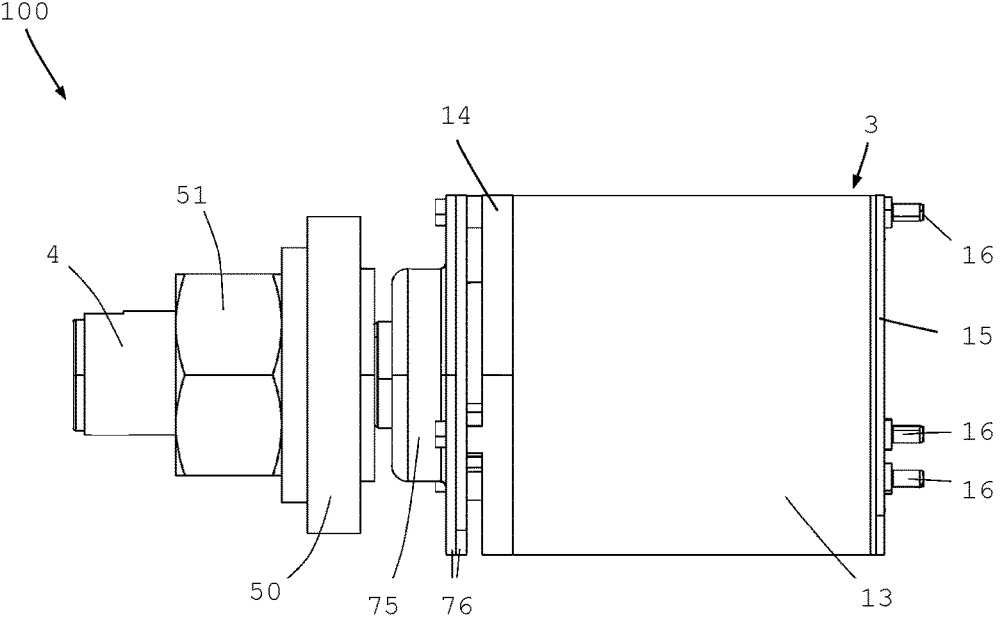
FIG. 2 shows a side view of a braking device.

FIG. 2 shows a side view of a brake device 1 with a holder 4 which can be fastened to a bracket 50, for example, via a nut 51. The braking device 1 has two braking components 2,

3, of which the inner braking component 2 is not visible in the figure. The inner brake component 2 is connected to the holder 4. The holder 4 and the inner brake component 2 are designed to be stationary here. The other brake component 3 includes the casing part 13 and is rotatably accommodated on the first brake component 2.

The braking device 1 has a compact design and inside the shielding device 75, which has a two-part shielding body 76 as a shielding housing, has a sensor device 70 (not visible here) for detecting the rotational position and the axial position of the casing part 13. The casing part 13 is connected via pins 16 is connected to a left lid 14 and a right lid 15 to seal an inner closed chamber 110.

Figure 3A:
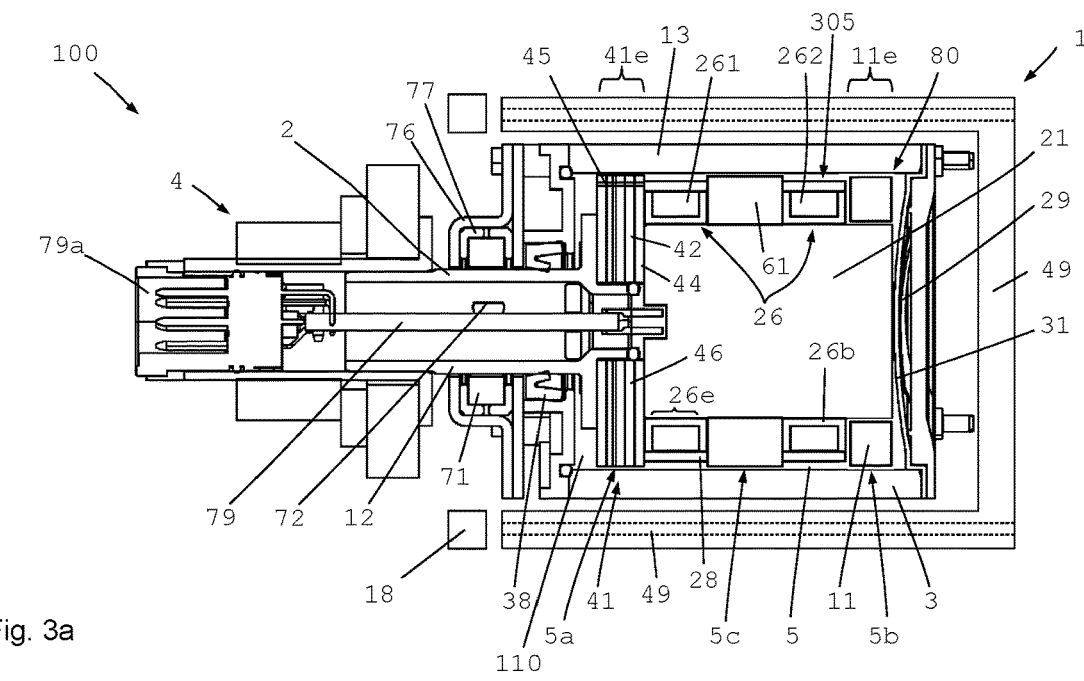
FIGS. 3a-3c shows different sections of braking devices.
Figure 3B:
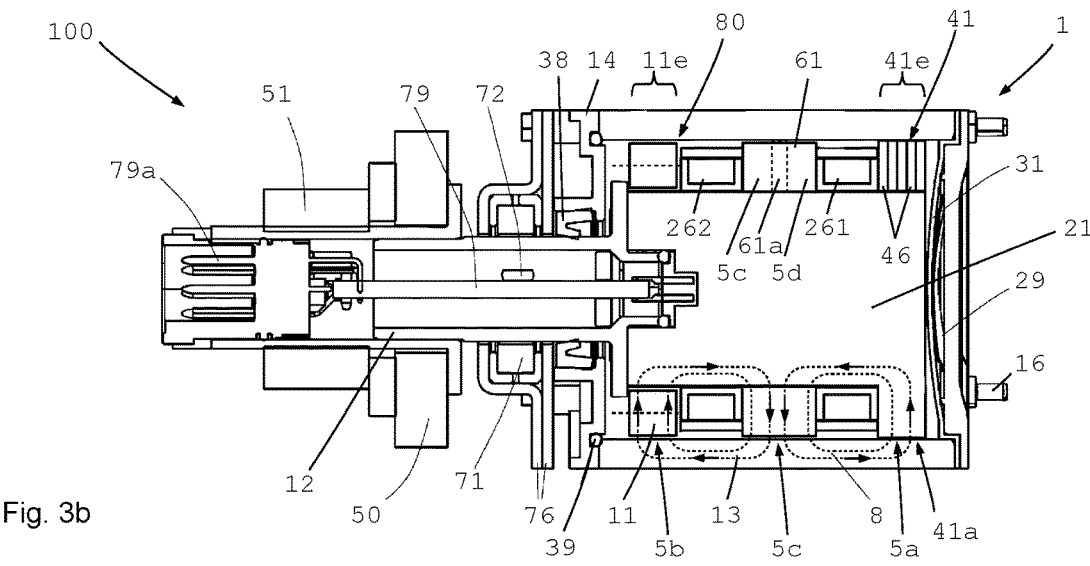
Figure 3C:
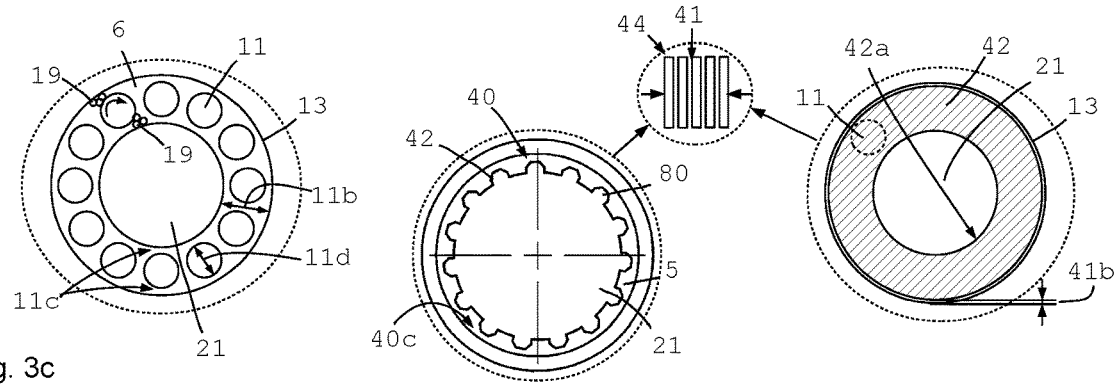

In FIGS. 3*a* to 3*c* possible cross sections of a braking device 1 are shown, e.g., from FIG. 2. Mounted on the bracket 4 is the brake component 2 extending in the axial direction and to which the core 21 is fixed. The core 21 is surrounded radially by the (magnetically conductive) casing part 13 as the outer or second brake component 3.

The magnetically conductive core 21 is surrounded by two electrical coils 26 which are wound around the core 21. The first electric coil 261 extends over an axial width 26*e*. At the end of the core 21 facing the holder 4, a disk contour 41 is formed, which is applied here to the core and e.g., is pressed. For this purpose, the disk contour 41 has a disk body 42 designed as a hollow cylinder. The receptacle on the core can also be non-round.

In particular, the core 21 can be made of sintered material (metal). The core can be as simple as desired shape are manufactured.

The disk body 42 consists here of a disk pack 44 which is formed by a plurality of thin disk plates 46. Here, the sheet metal disks 46 are each formed as a stamped part and can be stamped out, for example, from a magnetically conductive sheet metal with a thickness of 1 mm or 2 mm or even 3 mm. In this way, the required number of sheet metal panes can be punched out easily and inexpensively in order to produce the desired thickness of the pane body 42.

The individual disk plates 46 are pressed together and applied to the core 21 and thus, for example, screwed or pressed. A braking gap section 5*a* remains in the area of the disk body 42 with a small gap height 41*b* between the outer diameter of the disk contour 41 and the inner circumference of the casing part 13. The axial width 41*e* of the disk contour 41 or its braking gap section 5*a* is determined here by the number of disk laminations 46 and can be larger or smaller than shown.

Here, the disk contour 41 is axially directly adjacent to the first electrical coil 261, which is accommodated in a coil holder 26*b* and is completely sealed radially on the outside by a casting compound 28.

The disk body 42 is connected to the core 21 and to the stationary brake component 2 and does not rotate during operation. This allows the formation of a hole or recess for the passage of the cables 45 for the electrical connection of the first and second electrical coils 261, 262.

The electrical coils 261, 262 can thus be connected quickly and inexpensively.

The disk contour 41 is formed here at the proximal end, that is to say at the end of the core 21 which faces the holder 4. At the distal end, i.e., at the other end of the core 21, a second braking gap portion 5*b* is formed. The second braking gap section 5*b* extends over an axial width 11*e*. There, the rolling elements 11 are distributed on the circumference of the core 21. The rolling elements 11 reinforce the magnetic field locally. The rolling bodies 11 can form a type of magnetic field concentrators 80 for local amplification of the magnetic field as it passes through the second brake gap section 5b.

The second braking gap section 5b allows a very high braking torque to be achieved with the second electrical coil 262, in particular at low speeds of rotation of the casing part 13. Through the first brake gap section 5a in the area of the disk contour 41, a still strong magnetic field can be transmitted from the core 21 to the casing part 13 with the first electrical coil 261 at high speeds, since the gap height 41b is considerably smaller than the radial free space 11c in the area whose brake gap section is 5b. As a result, a high torque can be generated, which is also made possible, in particular, at higher speeds. As a result, a high and finely adjustable torque can be made available over the entire speed range by targeted and separate activation of the two electric coils 261, 262.

The axial width 11e of the second brake gap section 5b and the width 41e of the first brake gap section 5a are approximately the same here (+/–25%) and each shorter than an axial width of the third brake gap section 5c. Overall, a very compact structure is achieved.

The casing part 13 is surrounded by a cover 49 as a rotary knob 23 in FIG. 3a. The knob 23 is at least partially transparent so that it can be illuminated by the lighting means 18 in the form of LEDs, for example. The lighting can be controlled depending on the situation or independently of the situation. This version is primarily intended for steering devices for computer games, but can also be used in vehicles.

At the front end, the closed chamber 110 inside the casing part 13 is closed off by a front cover 14 through which the brake component 2 is passed. A seal 38 is used for sealing. At the rear or distal end, the chamber 110 is initially delimited by an elastic membrane 31, which is adjoined on the outside by a click element 29 designed here as a snap-action disk.

The second coil 262 or the associated core material is also designed here as a remanence device 305. If the retentivity device 305 was previously activated, a magnetic field that influences the medium 6 and thus maintains a braking torque remains even after the power supply has been switched off. For example, a steering wheel lock can be enabled without additional power consumption. A parked vehicle should consume as little electricity as possible, ideally none at all, otherwise the battery could be drained (both in vehicles with a combustion engine and in electrically powered vehicles). The steering wheel lock should therefore apply a high locking torque even when there is no current. A remanence device can provide this.

FIG. 3b shows a slightly different representation of a braking device 1, in which case, in contrast to FIG. 3a, the cover 49 or the rotary knob 23 has been omitted.

A major difference between FIGS. 3a and 3b is that in FIG. 3b the first braking gap section 5a with the disk contour 41 is provided at the distal end of the casing part 13, while the second braking gap section 5b with the rotating bodies 11 is at the proximal end of the casing part 13 is provided.

In this configuration, for example, a bearing for supporting the casing part 13 relative to the brake component 2 can be provided outside of the chamber 110 between the seal 38 and the sensor device 70. However, it is also possible here that the bearing at one end only takes place via the seal 38 and at the other distal end only via the disk contour 41.

The disk contour 41 can be formed (circumferentially) in one piece with the core, as is shown schematically in the lower part of FIG. 3b. Or the disk contour 41 comprises a (circular) disk pack with a plurality of disk plates 46, as is shown by way of example in the upper part of FIG. 3b. The disk contour can also be placed on the core as a solid separate part, that is to say it can practically consist of a single disk sheet of correspondingly greater thickness.

Some magnetic field lines 8 of the first electric coil 261 and the second electric coil 262 are drawn in as an example in FIG. 3b. Furthermore, it can also be seen that in each case an (approximately) radial passage of the magnetic field lines 8 takes place in the braking gap sections 5a and 5b. A higher torque is generated in the brake gap section 5a at higher speeds, while a higher torque is generated in the brake gap section 5b at lower speeds. The respective magnetic field is closed in each case in the central area by the (roughly) radial transition to the third brake gap section 5c. There is practically a thin gap at the braking gap section 5c, similar to the first braking gap section if a cylindrical disk contour 41 is used there.

The magnetic field sensor 72 is mounted on a sensor circuit board 79 and can be contacted via the contact pins 79a. The electrical coil 26 is also supplied with current via this.

At least in the area of the sensor device 70 and the magnetic field sensor 72, the inner brake component 2 is preferably made of a material that is not magnetically conductive or has little or no magnetic conductivity, in order to enable detection of the orientation and the intensity of the magnetic field of the magnetic ring unit 71 in the interior of the axle with as little interference as possible 12 or the first brake component 2 to ensure. The sensor device 70 is accommodated there in a particularly protected manner (protection from water and dust).

An O-ring 39 can be seen in FIG. 3b. which seals the cover 14 against the casing part 13.

The third braking gap section 5c is formed on the ring contour 61. The ring contour 61 can be slid onto or attached to the core 21 as a separate ring, or the ring contour 61 is formed in one piece with the core 21. In any case, the ring contour 61 is coupled to the core 21 in a magnetically conductive manner.

In a purely schematic manner, the top half of FIG. 3b shows an alternative embodiment in which a fourth braking gap section 5d is integrated. The fourth brake gap section 5d can, for example, arise from the fact that the annular contour 61 provides two separate braking gap sections 5c and 5d. For example, two magnetically conductive ring parts can be included, which are separated from one another by a magnetically less conductive intermediate part or ring part 61a. Then two axially separated brake gap sections 5c and 5d are formed. In other configurations, the electrical coils 261, 262 and the brake gap sections 5c, 5d can also be arranged further apart from one another, so that two magnetic circuits which are further separated from one another are produced.

A structure with three braking gap sections, with the central braking gap section 5c being provided for both electrical coils 261, 262, enables a particularly compact structure.

A structure as shown in FIG. 3a or 3b provides an advantageous embodiment. The second electrical coil 262 enables a particularly strong braking torque in the second brake gap section 5b via the rolling elements 11, in particular at low speeds or at a standstill. The first electrical coil 261 enables a high braking torque at higher speeds via the very small gap height in the first braking gap section 5a.

If a rotational movement is to be braked and a stop is to be made available, then the first electric coil 261 on the first brake gap section 5a enables stronger braking at higher speeds than the second electric coil 262 on the second brake gap section 5b. At a relatively low transition speed, the braking torque that can be generated with the second electric coil 262 in the second brake gap section 5b becomes greater than the braking torque that can be generated in the first brake gap section 5a at this speed. This is due to the fact that the braking torque that can be generated via the rolling bodies 11 is more dependent on the rotational speed and drops at higher rotational speeds. A combination of different brake gap sections 5a, 5b can thus be used to set optimal conditions for different speeds.

FIG. 3c shows basically schematic cross sections of the braking gap sections 5a and 5b and 5c. The second brake gap section 5b is shown on the left, wherein the core 21 can be seen on the inside, on which the rolling bodies 11 are arranged schematically all around. The rolling bodies are in turn surrounded by the casing part 13. The rolling elements each have a diameter 11d. A radial gap height 11b is slightly larger than the diameter 11d. A radial free space 11c results as the difference between the gap height 11b and the diameter 11d. The radial free space 11c is generally divided relatively evenly radially on the inside and radially on the outside.

A magnetorheological medium which comprises magnetorheological particles 19 is accommodated in the chamber 110. A gap 5 is provided in the chamber 110 between the brake components 2 and 3. At the gap 5, the three braking gap sections 5a, 5b and 5c are formed. The chamber 110 is at least partially filled with a magnetorheological medium 6 here. The medium here is preferably a magnetorheological fluid, which comprises, for example, as a carrier liquid, an oil in which ferromagnetic particles 19 are present. Glycol, grease, water and viscous materials can also be used as a carrier medium, but are not limited to them. The carrier medium can also be gaseous or the carrier medium can be dispensed with (vacuum). In this case, only particles 19 that can be influenced by the magnetic field are filled into the chamber 110.

The ferromagnetic particles 19 are preferably carbonyl iron powder, with the size distribution of the particles depending on the specific application. A particle size distribution of between one and ten micrometers is specifically preferred, although larger particles of twenty, thirty, forty and fifty micrometers are also possible. Depending on the application, the particle size can also become significantly larger and even reach the millimeter range (particle balls). The particles can also have a special coating/shell (titanium coating, ceramic, carbon shell, etc.) so that they can better withstand the high pressure loads that occur depending on the application. The magnetorheological particles can for this application not only be carbonyl iron powder (pure iron), but e.g., can also be made of special iron (harder steel).

It is possible that only particles that can be influenced by the magnetic field are filled into the gap 5 or the chamber 110, with air or an inert gas being added if necessary. If, for example, only air or another gas is used, different solids can be mixed to improve certain properties. For example, graphite powder can be mixed in to reduce the friction between the carbonyl iron particles since graphite has a lubricating effect. In particular, the particles can be coated with PTFE. A coating with PTFE or a comparable coating prevents in particular that the particles clump together and form larger clusters. Such larger heaps do not disintegrate easily or may not disintegrate at all. Alternatively, the disk bodies or roller bodies can be coated with PTFE to reduce friction. When using MRF without oil or other liquid as a carrier medium, it must be ensured that no water condenses in the brake chamber (MR space or MRF space). For example, silicic acid gel (known as silica gel) or another desiccant that absorbs water and thus removes moisture from its surroundings can be mixed in.

If powder is used without a carrier liquid, up to about 80 percent by volume of carbonyl iron (iron powder) is possible, which greatly increases the braking torque if the remaining design parameters are adjusted accordingly (e.g., the field strength per particle should remain the same as with a magnetorheological fluid (MRF), i.e., the field strength in the braking gap or effective gap should be twice as high when changing from, for example, LORD MRF 140 (40 percent by volume carbonyl iron with e.g., oil as the carrier liquid) to 80% carbonyl iron powder (without carrier liquid). We are talking about magnetic field strength in the gap of greater 200 kA/m up to values of up to 1,000 kA/m (1000000 A/m) or more. Another advantage of powder as a medium in the active gap is that there is no sedimentation and no accumulation in the sense of "the iron particles MR liquids are pulled in the direction of the magnetic field gradient (the force on magnetizable particles always acts in a direction of the stronger magnetic field, the carrier medium is displaced)" must come in order to obtain such high particle concentrations. The maximum particle concentration is already there. This improves the reproducibility of the torques (a similar braking torque always occurs with the same current).

In all configurations, it is particularly preferred that the magnetically polarizable particles (to a significant extent) include non-round particles (non-spherical particles) in which a ratio of the largest diameter to the largest transverse extension perpendicular thereto is greater than 1.25 or 1.5. It is also possible to form this ratio as a ratio of the greatest longitudinal extent to the greatest transverse extent, with the longitudinal and transverse extents in particular being measured perpendicular to one another.

The use of out-of-round particles is particularly advantageous since they enable an effective canting structure, since different out-of-round sections of the particles jam or wedge with one another.

Ratios of the largest diameter to the largest transverse extension perpendicular thereto of 1.75 or 2.0 or more are also possible and preferred.

At least some of the magnetically polarizable particles are preferably designed to clamp or wedge together over a large area under the influence of the magnetic field. This is possible, for example, with particles that are angular in sections or, for example, are triangular or polygonal overall or the like. Two (or more) correspondingly configured particles then jam together and can cause the particles to clump together very effectively and cause the two brake or clutch components to jam and brake together.

At least some of the magnetically polarizable particles are preferably designed to clamp or wedge together under the influence of the magnetic field at two or more locations spaced apart from one another. Such particles, which are non-circular, allow a very effective increase in braking force or braking torque, since, unlike spherical particles, they do not only touch at one point or in a small angular range, but at several points or even over an area.

Preferably, at least a portion of the magnetic polarizable particles at least one trough section. Such an inwardly curved trough section allows particularly effective wedging with parts of other particles.

Preferably, at least one surface of at least one clutch or brake component adjoining the brake gap is designed to be non-smooth or (locally) uneven at least in sections. It is also possible that the particles or a significant part of the magnetically polarizable particles have elevations or elevations and/or depressions regularly or irregularly on the outer surface. As a result, canting with the particles can be reinforced. For example, at least one surface can have elevations and/or depressions in the manner of pointed or rounded dimples in golf balls. A surface with a pointed or rounded sawtooth profile is also possible. A relative height (at least some) of the peaks or valleys is preferably at least 5% or 10% of the minimum diameter of a magnetically polarizable particle.

It has been found that a particularly effective canting and jamming of individual particles can be generated with high magnetic field strengths. For this purpose, a magnetic field strength of greater than 150 kiloamperes/meter (kA/m) or of 250 kiloamperes/meter or 500 kA/m or more is preferably generated in the gap. In particular, a magnetic field strength greater than 500 kiloamperes/meter (kA/m) or 750 kiloamperes/meter or 1000 kA/m or more can be generated or is generated in the gap, preferably in at least one of the braking gap sections.

If only powder is used without a liquid carrier medium, a different type of seal can be selected, thereby reducing the basic friction. The seal does not have to be pressed as hard against the surfaces, since it is not necessary to seal for liquids, only particles. It can also e.g., be a non-contact shaft seal such as a labyrinth seal. This type of seal only rests on one of the two mutually rotating parts. In addition, the temperature dependence is reduced or almost eliminated. Liquid carrier media change their viscosity with changing temperatures, while carbonyl iron powder hardly changes its properties in very large temperature ranges (until the curie temperature is reached). The temperature-related volume change is also negligible for powder, since the particles can redistribute among themselves if the volume of the individual particles changes.

The maximum volume fraction of carbonyl iron particles in powder form (approx. 74%) is also higher than in MRF with e.g., oil as a carrier medium.

The magnetorheological particles 19 chain together when a magnetic field is applied, as shown very schematically on the left in FIG. 3c. This creates a wedge effect, which leads to a significant increase in the braking torque at low and medium speeds.

For a more detailed explanation of this effect, reference is made to FIG. 4 of the applicant's international application WO 2018/215350 A1, which, with regard to the explanation of the effect, is fully included in the scope of disclosure of this application in an adapted manner.

A cross section through the first or also the third brake gap section 5a, 5c in the area of the disk contour 41 is shown on the right in FIG. 3c is. Radially on the outside between the outer contour of the disk contour 41 and the inner circumference of the casing part 13 there is a gap height 41b which is considerably smaller and can be selected to be considerably smaller than the radial free space 11c in the second Braking gap section 5b. The disk body 42 can be solid or can be designed as a disk pack 44 and include a plurality of disk plates 46. The first and the third braking gap section 5a, 5c can in principle have identical or similar cross sections.

A rolling body 11 is shown in dashed lines in the right-hand part of FIG. 3c, just as an example, in order to clarify the differences. It can be clearly seen that the disk body 42 allows a gap height 41b with a smaller height. As a result, a strong braking torque and a high magnetic field strength can be achieved and transmitted there. A desired magnetic field strength and braking effect can be set independently via the other electric coil in the second brake gap section 5b. Both magnetic fields are closed via the third brake gap section 5c.

A cross section of a further embodiment of a brake gap section is shown in the center of FIG. 3c. This braking gap section has a disk contour 41 designed as a star contour 40. The star contour 40 has a non-round peripheral surface. This creates a braking gap section with a variable gap height 40c over the circumference. This can also result in a kind of wedge effect and a high torque can be set, especially at low speeds. The radially outward (or inward) protruding elements can be used as magnetic field concentrators 80 are referred to, which locally concentrate the magnetic field. A star contour 40 can also be in the form of a disk assembly 44 and can include a plurality of (e.g. star-shaped) sheet metal disks 46.

A star contour can also be formed in the axial direction, which means that variable gap heights occur in the axial direction. As a result, the magnetic field can be concentrated in the axial direction at locations with smaller gap heights and reduced in the higher gaps. There is also a mixture of "radial" and "axial" or/and oblique star contours conceivable.

In particular, this configuration is suitable for the second braking gap section 5b as a replacement for a (second) braking gap section (5b) with rolling bodies.

The sensor device 70 is shown in detail in FIG. 4. The first brake component 2 and the second brake component 3 embodied here as a casing part 13 are only indicated (dashed lines). The sensor device 70 is supported in a magnetically decoupled manner via the decoupling device 78 on the rotatable second brake component. The shielding device 75 here consists of three shielding bodies 76 which reduce the scattering of the magnetic field 8 of the electrical coil 26. The shielding device 75 can also only consist of pot-shaped bodies or a pot-shaped body and a disk-shaped body that are connected to one another.

Figures 4A, 4B, 5, 6:
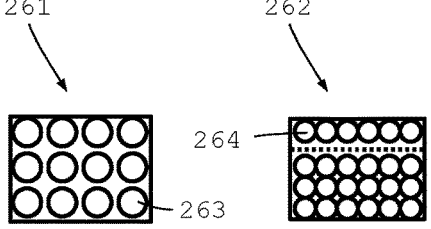
FIGS. 4*a*-4*b* is a highly schematic view of a sensor setup and measurement results.
FIG. 5 is a highly schematic view of a braking devices with a snap disk in different positions.
FIG. 6 shows two differently designed electric coils.

In addition, there is also a separating unit 77 for magnetic separation. The magnetic ring unit 71 is used to measure the orientation or the angle of rotation s of the magnetorheological braking device 1 is used. The magnetic field sensor 72 is arranged inside the first brake component 2, which is non-magnetic in this area. Small relative axial displacements, such as those caused by actuating a snap-action disk, for example, can be used to detect the actuation of the control button 101, as shown in FIG. 4b. The angle of rotation and the orientation of the magnetic field lines drawn in by arrows can be detected by the magnetic field sensor 72.

Due to an axial displacement, the received signal 68 of the sensor device 70 changes according to the illustration in FIG. 4b. FIG. 4b shows the course of the amplitude 69 of the signal s 68 detected by the magnetic field sensor 72 as a function of the axial displacement of the brake components 2, 3 relative to one another. By axial displacement of the magnetic field sensor 72 relative to the magnetic ring unit 71 changes the amplitude 69 of the detected signal 68. An axial displacement or a depression of an operating button 101 can be detected in this way.

The angle of rotation can also be detected with the same sensor 72, the direction of the magnetic field 8 (arrows shown) being determined to detect the angle of rotation. The intensity determines the axial position. A change in the signal 68 can therefore be used to infer that a button or the snap disk 29 has been actuated. This is advantageous since a single (multidimensional) Hall sensor can be used to determine the angular position and to determine an axial position.

FIG. 6 shows, purely schematically, two differently designed electrical coils 261, 262, in which case the number of windings can differ. The size/type of diameter and shape and material of the wires 263, 264 can also be different. The size and external shape of the electric coils 261, 262 can be the same (shown with a solid line) or different, so the second electric coil 262 can also have a smaller cross section, for example, as shown with a broken line. As a result, different properties can be set on the magnetic circuits. One magnetic circuit can be designed for a faster reaction speed and/or a higher braking torque, while the other can be designed better in the braking capacity and/or more energy efficient. A wide variety of property combinations can be achieved. The material on the braking gap sections can also be different.

Figure 7:
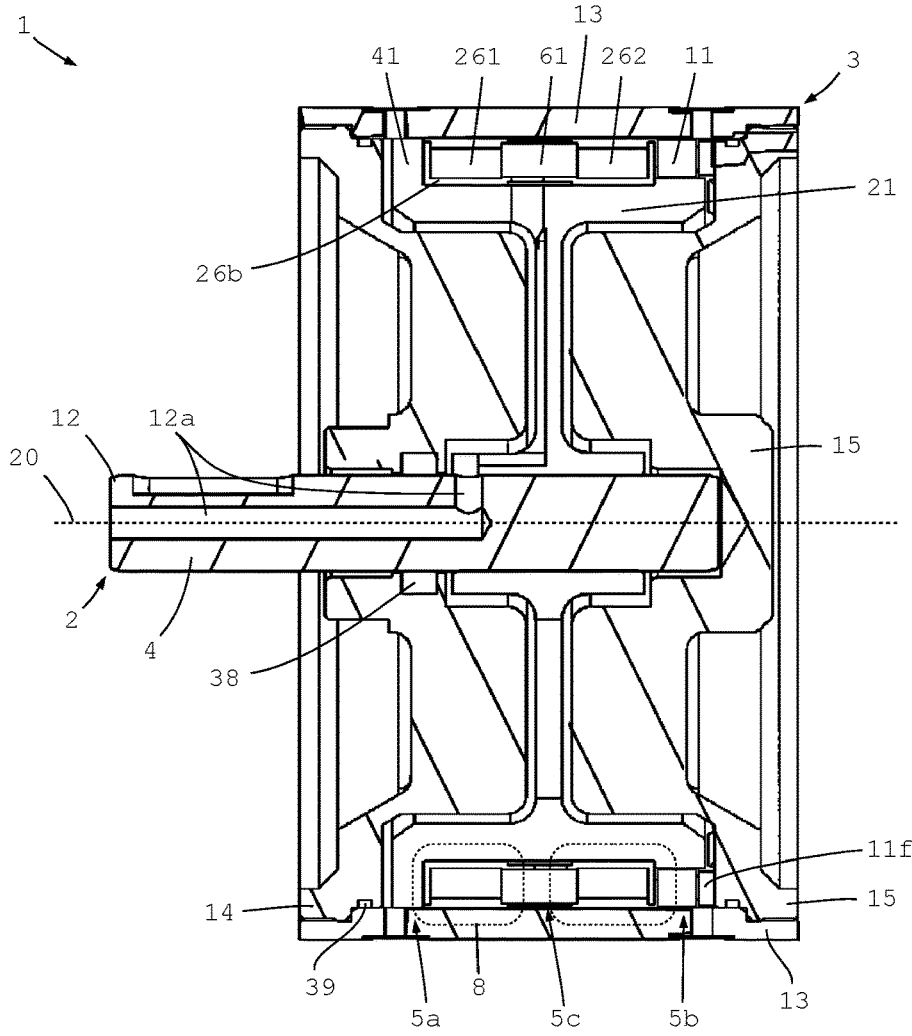
FIGS. 7-8 shows another haptic braking device in section and in a perspective.
Figure 8:
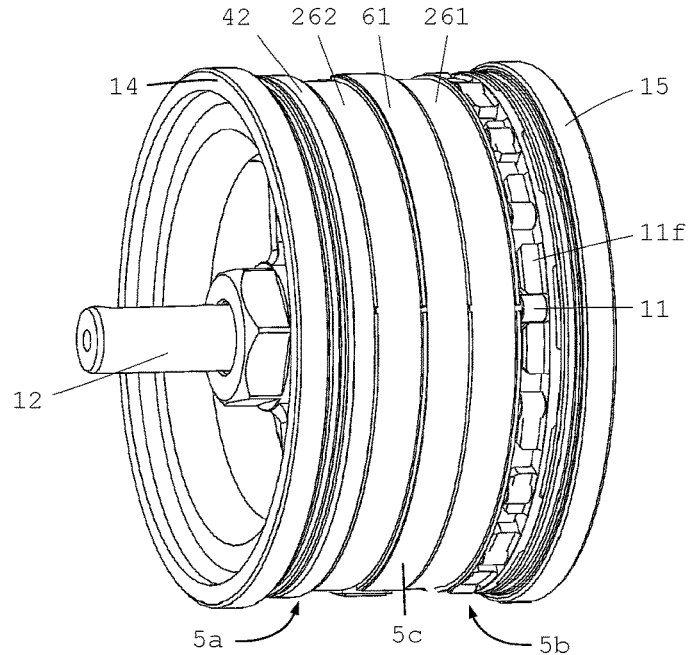

FIG. 7 shows a schematic cross section of another braking device 1, wherein the first brake component 2 at a designed as an axis 12 holder 4 is added. In this embodiment, too, three brake gap sections 5a, 5b, 5c are provided, with a disk contour 41 being formed on the first brake gap section 5a and rolling bodies 11 or rotating bodies on the circumference of the core 21 being accommodated on the second brake gap section 5b. The rolling elements 11 are guided over brackets 11f.

A reservoir 32 for magnetorheological particles can be present in the interior in order to ensure an adequate supply of the brake gap sections with magnetorheological particles. In particular, carbonyl iron particles are attracted from the environment and concentrated in the magnetic field transition region.

In FIG. 7, a cover 14 is attached to the front (left) end and a cover 15 is attached to the rear end.

The disk body 41 is designed here in one piece with the core 21, but can also be designed as a disk assembly 44 with a plurality of disk plates 46

A cable bushing 12a is formed on the hollow axle 12, through which the cables for supplying the two electric coils 261 and 261 are passed. The (separate) core 21 is accommodated on the inner part. On the core 21, the two electric coils 261 and 262 are wound on coil holders 26b. Between the two electrical coils 261 and 262, the ring contour 61 for the third brake gap section 5c is taken or formed. In simple configurations, the ring contour 61 is applied to the core 21 as a separate part and provides a thin gap between the outside of the ring contour 61 and the inner circumference of the casing part 13. The third brake gap section 5c is used to close the two magnetic fields of the two electrical coils 261 and 262.

The magnetic field of the first electrical coil 261 runs essentially radially through the first braking gap section 5a and the third braking gap section 5c and axially through the core 21 and the casing part 13. The magnetic field of the second electric coil 262 runs essentially radially through the second braking gap section 5b and the third braking gap section 5c and axially through the core 21 and the casing part 13.

The two electric Coils 261, 262 are wound and energized in such a way that the magnetic fields of the two electrical coils 261, 262 run in the same direction in the region of the third brake gap section 5c, as also shown schematically in FIG. 3b. Overall, a braking device 1 that can be produced very inexpensively is made available, with at least one bearing being able to be saved if necessary by "bearing" via the disk contour 41, which also reduces the overall height. A very low basic friction is achieved. The fact that fewer parts are used, the manufacture becomes simpler and more cost-effective A smaller number of parts also improves the tolerance requirements, since tolerance chains are avoided.

A braking torque can be set separately with the two electrical coils 261, 262 in each case.

Figure 9:
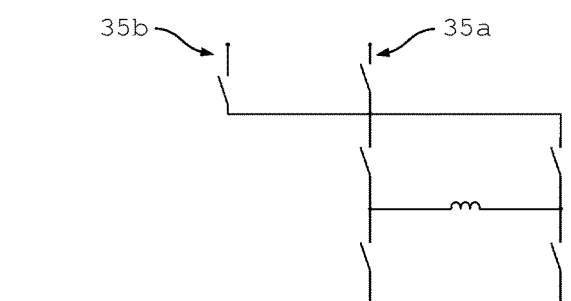
FIG. 9 shows a highly schematic circuit for driving the electrical coil.

FIG. 9 shows a schematic of a circuit for rapid activation of the electric coil 26. The electric coil 26 (magnetic coil) is activated here by an H circuit. This is only indicated in FIG. 9 by switches. A voltage source 35a used in normal operation or in continuous operation with a lower voltage of z. B. 12V provides the voltage for normal operation. For the voltage peaks, a voltage source 35b with a higher voltage of, for example, 18V or 24V is connected via a switch. Then, the lower voltage power source 35a is temporarily disconnected. After the maximum current has been reached, the voltage source 35b with the higher voltage is separated again from the circuit and the electrical coil 26 and the voltage source 35a is again connected with it low voltage connected. The switches can be any electrical components that are particularly capable of coupling and decoupling in the millisecond range.

As a result, the current in the electrical coil 26 reaches the desired value more quickly. In a specific case, the desired current is reached within 10 ms instead of ms. The change between the voltages can take place via an electrical circuit.

Figure 10:
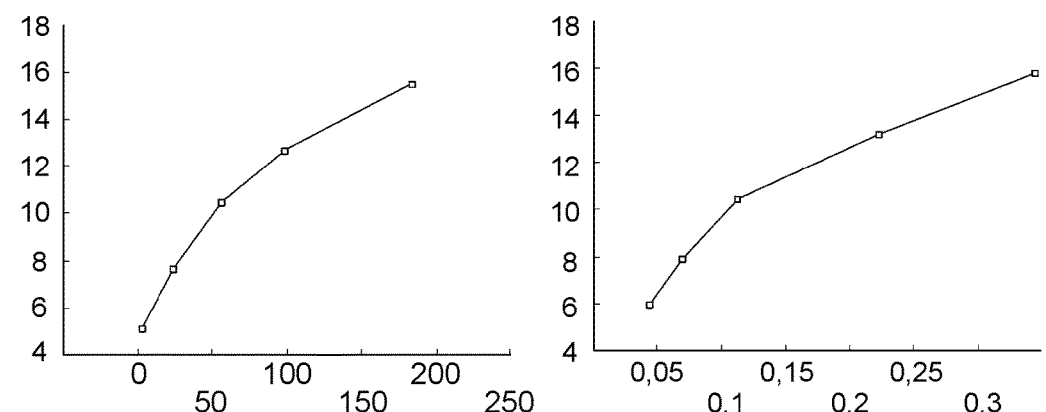
FIG. 10 is a sketch with braking torque curves for illustration of how the braking device works.

FIG. 10 shows a schematic representation of two generated braking torque curves, the generated braking torque (normalized and therefore dimensionless here) being plotted against the electrically introduced power (normalized and therefore dimensionless here). The curve for a BLDC motor ("brushless direct current motor") is shown on the left and the curve for a magnetorheological braking device is shown on the right. It can be seen that the electric motor requires significantly more current than the magnetorheological braking device for the same braking torque a braking torque of "14" requires the electric motor more than "130" normalized power, while the magnetorheological braking device (clearly) requires a power of less than "0.3". The power consumption ratio is greater than 100:1 and is around 500:1 here.

Magnetorheological clutch devices and brakes have the advantage, among other things, that they require little power to engage or dampen movements, are quiet, generate little heat and react very quickly (~ms), etc. The low power requirement is particularly advantageous for battery-operated components such as e.g., electric vehicles, in which the power consumption of all components is automatically reflected in the range of the vehicles. However, power consumption is also an issue in vehicles with combustion engines or electrical devices in general.

Figure 11:
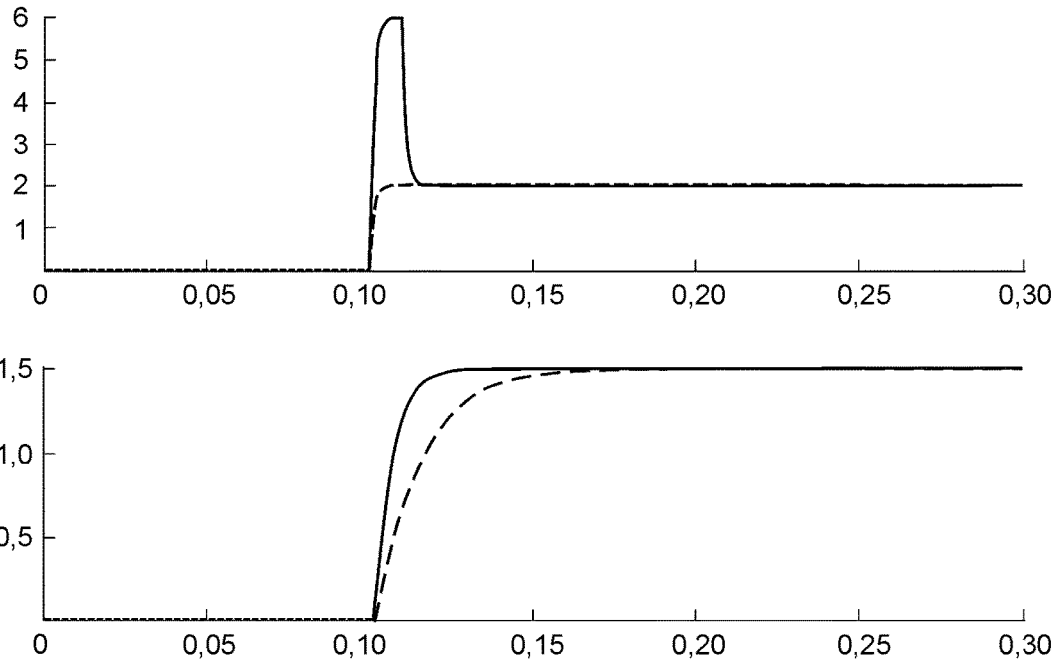
FIG. 11 shows another sketch with braking torque curves.

The system requires much less power than a controller just by an electric motor. In general, it is currently the case for electrically powered motor vehicles that you can travel around 6 km with 1 kWh, while one kWh of battery capacity costs around 230 euros, with one kWh of battery capacity causing around 6 kg more weight. Even if this data will change in the future, energy demand will continue to play an important role. FIG. 11 shows the resulting braking torque curves of a magnetorheological braking device 1 for two different current strength curves over time. The dashed curve in the upper half of the figure represents the conventional course, in which the current intensity is increased directly to the desired current intensity.

Here, at the point in time 0.1 seconds, the current intensity is increased from 0 amperes to 2 amperes. The resulting course of the braking torque or the coupling intensity is shown in broken lines in the lower half of FIG. The transmittable braking torque increases in the dashed curve from the start time at 0.1 seconds within about 25 milliseconds (time 0.125 seconds) to a read value of about 1.25

(normalized to e.g., an average value or a standard unit) and reaches after about 75 milliseconds (point in time 0.175 seconds) asymptotically (almost) the set limit value of about 1.5.

If, on the other hand, at the beginning of the clutch or the start of the braking process, the current intensity is increased threefold to z. If, for example, 6 amperes are increased here, as shown by the solid lines, the braking torque increases considerably more and reaches the final value of 1.5 after around 10 milliseconds. Here, the "current boost" with an increased current is only activated for about 10 ms. After that, as shown by the upper solid curve, the current is reduced to 2 amperes. By briefly increasing the current ("current boost"), the clutch or braking torque can be adjusted significantly more quickly. This is very advantageous in several respects, as it allows you to stop quickly and experience a more direct haptic feeling (feedback).

A major advantage of the construction is that no cables, sensors or electronics are required on the outside. A high IP class is therefore possible in all configurations. In principle, everything is behind a mounting panel.

The electrical coils are preferably completely separated from the space containing the magnetorheological medium, in particular by means of a casting compound.

In preferred configurations, an axial displacement is possible, in which case, in particular, a liquid volume is displaced in the interior. Sufficient space is preferably provided between a cover and a disk contour so that the medium (or liquid) (carbonyl) therebetween is not compressed. (Otherwise, this could lead to high axial adjustment forces.) This provides an additional MRF reservoir from which particles can flow into the area of the disk contour or the rolling elements. Namely, magnetic particles always flow in the direction of the stronger field since magnetic particles are attracted by the magnetic field gradient.

The seal preferably runs on the axle. There is rotary movement (more than 100,000 revolutions are possible) and there can be linear movement for the probe. To ensure that the seal does not run in and form a running groove and that the friction is low and the leakage (drag oil) does not become too high over the service life, a corresponding material pairing with a hard running surface is preferred.

The first brake gap section 5a is preferably equipped with a disk contour. The second braking gap section 5b is equipped in particular with rolling bodies and in particular rollers. Rolling elements and especially rollers with a round inner ring enable a high static moment. A disk contour enables good magnetic field transmission and high torque at high speeds.

The combined solution, also called hybrid solution, combines both benefits. In contrast, an axial transition of the magnetic field in the prior art had a smaller transition area and thus resulted in lower braking torques. In addition, an axial magnetic field transition has a smaller distance (radius) and therefore generates less moment. A brake gap section 5a, which is also radial, with a disk contour has a larger diameter and thus generates a larger moment with the same force. In addition, the area is larger because the larger circumference spans a larger area. If the width of the contour disk is greater than ⅙ of the diameter, the braking torque that can be transmitted at the (circumferential) radial braking gap section is already greater than the maximum braking torque that can be transmitted on the axial surface! Finally, due to the lower gap height at the disk contour, the magnetic losses are smaller. All of this results in a higher braking torque, even at higher speeds.

Volume compensation for the push function can be provided by a membrane at the end of the jacket part. Behind the membrane there is a click element like a snap-action disk ("Snap Dome"). This gives a tactile pressure point. You can also hear the click when the pressure point is reached and the snap-action disk pushes the entire button or the casing part back into the starting position (similar to a mouse button on a computer mouse).

The membrane then seals the MRF space. The volume behind the membrane acts as a volume balance when pressed. In the normal position, the snap-action disk has a bulge. If the button is moved in the axial direction, the stator of the braking device presses against the membrane and the snap-action disk. This will flatten it out.

Normal glass can be used as the transparent material, or PMMA (acrylic glass). The advantage of PMMA is that you can use milky glass, which breaks the light inside and can thus illuminate the entire surface evenly. To the Lighting can be used one or more LEDs, also with different colors.

In all configurations, the outer brake component can also be designed to be non-rotatable and the inner brake component can be the rotatable component. In this case, the electric coil must be electrically contacted via lines through the outer braking component or e.g., via sliding contacts.

With the invention presented here, the required working range of the steering device can be divided into several sub-areas. A first portion is provided by the drive device 307 and offers an active drive torque e.g., between 0 and 8 newton meters. A second sub-area is provided by the first brake gap section 5a and offers a braking torque e.g., between 0 and 5 newton meters. A third sub-area is provided by the second brake gap section 5b and offers a braking torque e.g., between 0 and 25 newton meters. Due to the disk contour 41 in the first brake gap section 5a, a particularly high control quality can be achieved for the first partial area. Since this sub-area is particularly important for steering precision, the high control quality here has a particularly beneficial effect on steering behavior.

The steering device 100 presented here also has the advantage that the necessary active torque (driving torque) can be achieved by a compact and agile electric motor with high control quality and lower power consumption (better efficiency in the partial load range). The required low passive torque (braking torque, for example, up to 8 Newton meters) is achieved here by the first brake gap section 5a with particularly low basic friction and high control quality with low power consumption at the same time. The required higher passive torque (braking torque for example up to 25 newton meters) is here with the second brake gap section 5b with also particularly low basic friction and normal control quality at the same time achieved low power consumption. This results in triple redundancy.

At the same time, the steering movement can be influenced noiselessly and smoothly. In addition, in the event of a malfunction of the drive device 307, the braking device 1 can slow down its active torque. In addition, a motor curve (fluctuating torque over the angle of rotation) can be smoothed out or corrected by the braking device 1. In addition, the braking device 1 requires significantly less electricity than an electric motor to generate a comparable braking torque.

The steering device presented can also be used in combination with the on-board computer, display instrument or a head-up display as a game console or as a driving or flight simulator. When the vehicle is parked (e.g., in the case of electric vehicles, when charging) or the car has a self-driving mode, the user can use the steering device as an input device of a computer game. When changing from gaming mode to real ferry operation, haptic feedback is preferably provided.

Certain parameters of the steering device can also be set or configured or stored in a customer-specific manner, within system limits, via the on-board computer or other input devices (individualization). The individual settings can be called up using key recognition, smartphone or smart device communication, driver recognition (image recognition; face recognition), gesture control, voice control, data analysis or manual input.

LIST OF REFERENCES 1 magnetorheological braking device
2, 3 brake component
4 holder
5 gap
5a braking gap section for 41
5b braking gap section for 11
5c brake gap section for 61
5d brake gap section
6 medium
8 magnetic field, field
11 rolling element
11b gap height of 5b
11c radial clearance at 5b
11d diameter of 11
11e axial width of 11
11f bracket
12 axis
12a cable bushing
13 casing part
14 cover
15 cover
16 pin
18 bulbs
19 magnetic particles
20 axis of rotation, axial direction
21 core
22 hub
23 knob
26 coil
26b coil holder
26e axial width
28 casting compound
29 click element, snap disc
29a guide
29b volume
31 membrane
32 reservoir
35a power supply 12V
35b power supply 18V
38 gasket actuator device
39 O-ring
40 star contour
40c gap height
41 disk contour
41a integral annular flange
41b gap height of 5a
41e axial width of 5a
42 ring body, disk body
42a recording
43 user interface
44 disk pack
45 cable
46 disk sheet metal
47 bulging outer contour
48 filling screw
49 plating
50 bracket
51 nut
61 ring contour
68 signal
69 amplitude
70 sensor device
71 magnet ring assembly
72 magnetic field sensor
75 shielding device
76 shielding body
77 separation unit
78 decoupling device
79 sensor board
79a contact pin
80 magnetic field concentrator
100 steering device
101 operating head
102 operating roller
110 closed chamber
200 device component
261 electric coil
262 electric coil
263 wire
264 wire
301 steering unit
302 steering controller
303 actuator device
304 driver assistance system
305 remanence device
306 safety device
307 drive device
311 steering shaft

The invention claimed is:

1. A steering device for steering a vehicle by, comprising:
a movable steering unit;
at least one magnetorheological braking device configured to brake a movement of said steering unit;
said braking device having a stationary holder and at least two brake components, at least one of said at least two brake components is rotatable by said steering unit and at least one other of said at least two brake components is non-rotatably connected to said holder;
said at least two brake components being continuously rotatable relative to one another about an axis of rotation;
a first brake component of said at least two brake components extending along said axis of rotation and having a core made of a magnetically conductive material, and a second brake component of said at least two brake components having a hollow casing part extending around said first brake component;
at least one circumferential gap formed between said first brake component and said second brake component, said at least one circumferential gap being filled at least partially with a magnetorheological medium; and
said gap having at least a first braking gap section and a second braking gap section, said first braking gap section having a disk contour formed between said casing part and said core, and said second braking gap section having a plurality of rolling elements arranged on a circumference of said core.

2. The steering device according to claim 1, further comprising an actuator device configured for converting a movement of said steering unit into a vehicle movement, wherein said steering unit and said actuator device are only electrically and/or electromagnetically operatively connected.

3. The steering device according to claim 1, wherein said braking device has a braking torque when said magnetorheological medium is actively influenced and a basic torque when said magnetorheological medium is influenced in an inactive manner, and said basic torque increases by at least a factor 50 less than a maximum braking torque.

4. The steering device according to claim 1, wherein said braking device has an inactive influence on said magnetorheological medium of a basic torque of at most 0.5 Nm.

5. The steering device according to claim 1, wherein a maximum braking torque of at least 25 Nm is generated with said braking device by actively influencing said magnetorheological medium.

6. The steering device according to claim 1, wherein a braking torque generated with said second braking gap section is at least twice as high as with said first braking gap section.

7. The steering device according to claim 1, wherein only part of a maximum braking torque is configured to be generated with said first braking gap section.

8. The steering device according to claim 1, wherein a majority of a maximum braking torque is configured to be generated with said second braking gap section.

9. The steering device according to claim 1, wherein a braking torque can be set with said first braking gap section with a higher resolution than with said second braking gap section.

10. The steering device according to claim 1, wherein a braking torque with a resolution of at least 0.5 Nm is configured to be generated with said first braking gap section.

11. The steering device according to claim 1, wherein said first braking gap section is assigned a first electrical coil and said second braking gap section is assigned a separately controllable second electrical coil.

12. The steering device according to claim 1, further comprising at least one steering control unit configured for controlling said braking device based on at least one of a position of said steering unit, a movement parameter of said steering unit, and an operating state of the vehicle, and wherein said at least two braking gap sections can be controlled separately by said steering control unit.

13. The steering device according to claim 12, wherein said steering control unit is configured to select at least one braking gap section of said at least two braking gap sections as a function of said level of a braking torque to be set and brake said movement of said steering unit.

14. The steering device according to claim 12, wherein said steering control unit is configured to generate a braking torque for braking said movement of said steering unit at least predominantly with said first braking gap section when the vehicle speed is above a limit value.

15. The steering device according to claim 12, wherein said steering control unit is configured to block mobility of said steering unit and to generate a necessary braking torque predominantly with said second braking gap section.

16. The steering device according to claim 12, wherein said steering control unit is configured to generate an end stop for said mobility of said steering unit at least predominantly with said second braking gap section.

17. The steering device according to claim 12, wherein said steering control unit is configured to brake or block mobility of said steering unit as a function of a driver assistance system, wherein critical steering movements are prevented, and said steering control unit selects at least one braking gap section of said at least two braking gap sections and to brake or block mobility of said steering unit.

18. The steering device according to claim 12, wherein said steering control unit is configured to set said braking torque based at least in part on a user property.

19. The steering device according to claim 12, wherein said steering control unit is configured to generate a haptically perceptible feedback on said steering unit with a defined sequence of braking torques.

20. The steering device according to claim 1, wherein said magnetorheological medium has at least one metallic powder and said metallic powder has a volume fraction of at least 50%.

21. The steering device according to claim 20, wherein said metallic powder has a coating.

22. The steering device according to claim 1, further comprising at least one retentivity device and/or at least one permanent magnet unit which is configured to maintain a braking torque with at least one of said at least two braking gap sections even without a supply of electric current.

23. The steering device according to claim 1, further comprising at least one safety device configured to at least partially remove said magnetorheological medium from said gap.

24. The steering device according to claim 1, wherein said gap has a maximum diameter of less than 100 mm.

25. The steering device according to claim 1, further comprising at least one drive device configured to generate a drive torque for actively moving said steering unit.

26. The steering device according to claim 25, wherein said maximum braking torque of said second braking gap section is at least twice said maximum drive torque of said drive device.

27. The steering device according to claim 25, wherein said braking device, in an event of a failure of said drive device, is configured to provide a braking torque which is at least as high as its drive torque.

28. The steering device according to claim 25, wherein said steering control unit is configured to approximately compensate for fluctuations in said drive torque of said drive device by adjusting said braking torque.

29. The steering device according to claim 1, wherein said disk contour has at least one star contour, in an area of said star contour there is a variable gap height over a circumference of said braking gap section, and magnetic field concentrators are arranged on said star contour and protrude radially into said braking gap section.

30. The steering device according to claim 1, further comprising a third braking gap sections axially between said first braking gap section and said second braking gap section, and said first braking gap section having at least one first electric coil and said second braking gap section having at least one separately controllable second electric coil.

31. The steering device according to claim 30, wherein said first electrical coil and said second electrical coil are each received between said casing part and said core and are each wound around the axis of rotation.

32. The steering device according to claim 30, wherein said first electric coil and said second electric coil are configured differently based on at least on parameter selected from the group of parameters consisting of wire diameter and wire cross-section, number of windings, winding window, type of winding, coil width, coil diameter, and material.

33. The steering device according to claim 30, wherein said third braking gap section is formed by at least one annular contour arranged between said casing part and said core.

34. The steering device according to claim 33, wherein said first electrical coil is arranged axially between said first braking gap section and said annular contour and said second electrical coil is arranged axially between said annular contour and said second braking gap section.

35. The steering device according to claim 33, wherein said ring contour is configured as a separate part and magnetic fields of said first electric coil and said second electric coil run through said ring contour.

36. The steering device according to claim 1, further comprising a sensor configured for detecting a relative angle of rotation between said core and said casing part and/or for detecting a relative axial position of said casing part to said brake component.

37. The steering device according to claim 1, wherein said magnetorheological medium has a multiplicity of individual magnetically polarizable particles, and a magnetic field strength between individual magnetically polarizable particles of said magnetorheological medium is greater than 300 kA/m.

38. The steering device according to claim 1, wherein a magnetic field strength which can be generated in said gap is greater than 500 kA/m.

39. A method for operating a steering device, the method comprising:

providing a steering device with a magnetorheological braking device and two braking components, the two braking components being continuously rotatable about an axis of rotation relative to one another, wherein a first braking component extends along the axis of rotation and comprises a core made of a magnetically conductive material and wherein the second brake component comprises a hollow casing part extending around the first brake component, wherein at least three circumferential braking gap sections which are at least partially filled with a magnetorheological medium are formed between the first and the second brake component;

generating with a first electrical coil a controlled magnetic field in a first and a third braking gap section; and generating with a second electric coil an individually controlled magnetic field in a second and the third braking gap section to generate braking effects of different strength depending on a speed.

40. The method according to claim 39, wherein different fast braking effects are generated with the first electric coil and the second electric coil.

41. The method according to claim 39, wherein braking effects of different energy efficiency are generated with the first electric coil and the second electric coil.

* * * * *